United States Patent [19]

Yamada et al.

[11] Patent Number: 5,080,947
[45] Date of Patent: Jan. 14, 1992

[54] INFORMATION RECORDING MEDIUM

[75] Inventors: Katsuyuki Yamada, Yokohama; Narihito Kojima, Numazu; Yukio Ide, Mishima; Makoto Harigaya, Hiratsuka; Hiroko Iwasaki, Tokyo, all of Japan

[73] Assignee: Ricoh Company, Ltd., Tokyo, Japan

[21] Appl. No.: 477,577

[22] Filed: Feb. 9, 1990

Related U.S. Application Data

[63] Continuation-in-part of Ser. No. 289,001, Dec. 22, 1988, abandoned.

[30] Foreign Application Priority Data

| | | |
|---|---|---|
| Dec. 25, 1987 | [JP] Japan | 62-326741 |
| Feb. 1, 1988 | [JP] Japan | 63-19597 |
| Feb. 24, 1988 | [JP] Japan | 63-39634 |
| May 11, 1988 | [JP] Japan | 63-112568 |
| Mar. 29, 1989 | [JP] Japan | 1-77838 |

[51] Int. Cl.$^5$ .............................. B32B 3/02
[52] U.S. Cl. ............................ 428/64; 428/65; 428/323; 428/327; 428/913; 346/766; 346/135.1; 369/288; 430/945; 427/162
[58] Field of Search ............ 428/64, 65, 323, 327, 428/913; 346/766, 135.1; 369/288; 430/945; 427/162

[56] References Cited

U.S. PATENT DOCUMENTS

| | | | |
|---|---|---|---|
| 4,496,957 | 1/1985 | Smith et al. | 430/945 |
| 4,752,554 | 6/1988 | Sato et al. | 430/273 |
| 4,760,012 | 7/1988 | Mochizuki et al. | 430/273 |
| 4,828,758 | 5/1989 | Gillbers-LaForce et al. | 252/582 |

FOREIGN PATENT DOCUMENTS 63-77785  4/1988  Japan.

*Primary Examiner*—Patrick J. Ryan
*Attorney, Agent, or Firm*—Cooper & Dunham

[57] ABSTRACT

An information recording medium comprises a substrate and a recording film layer thereon comprising a hydrocarbon polymer and finely-divided particles of a metallic component dispersed therein, which recording film layer is a plasma polymerized film prepared by subjecting an organic metallic complex containing a center metal to glow discharging decomposition. The metallic component in the recording film layer may be a metal, a metal oxide or a composition of a metal and a metallic oxide. When a metal is employed as the metallic component in the recording film layer, information is recorded by applying laser beams thereto to form protuberances on the recording film layer corresponding to the recorded information, while when a metallic oxide or a mixture of a metal and a metallic oxide is employed as the metallic component, information is recorded by applying electron rays to reduce the metallic oxide to the metal to produce a recorded area and a non-recorded area having different reflectivities on the recording film layer, and the recorded information is erased by subjecting to the recording film layer to a heat treatment, so that reversible recording and erasing of information can be attained.

17 Claims, 12 Drawing Sheets

F I G. I
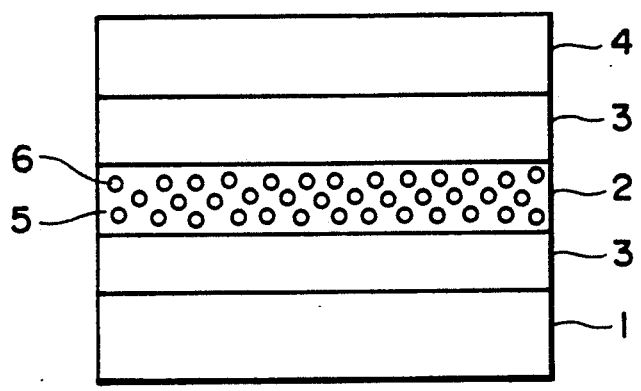
F I G. 2
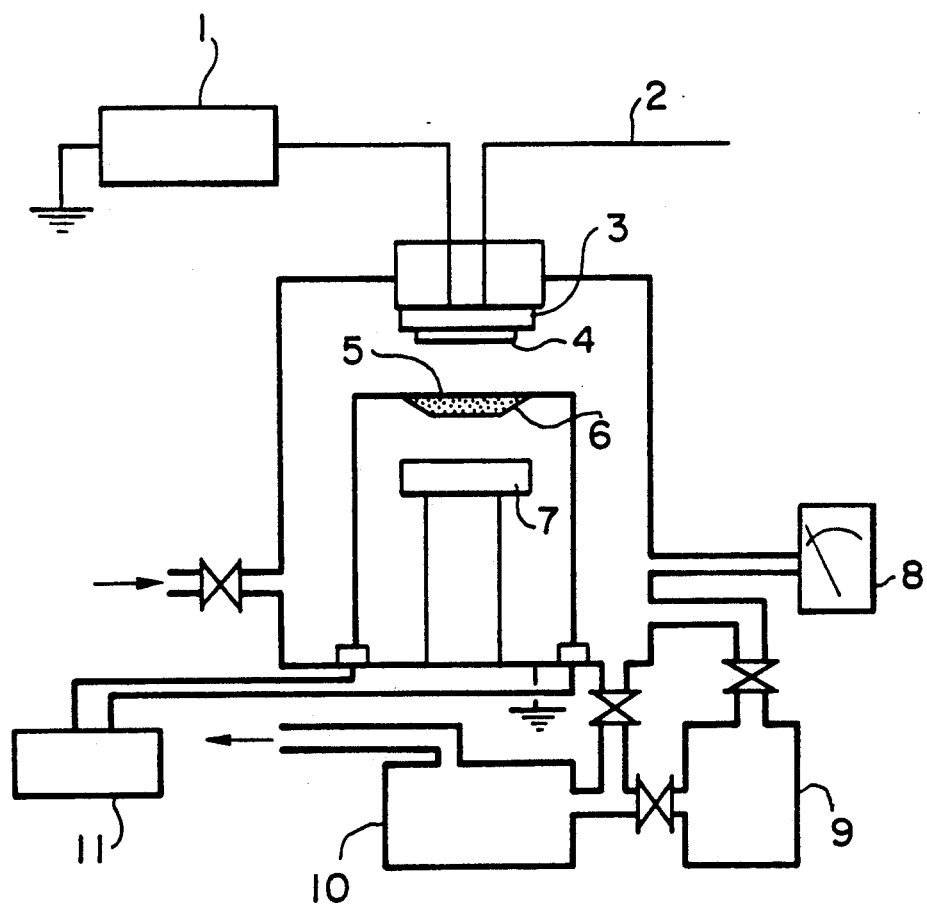

REACTION GAS

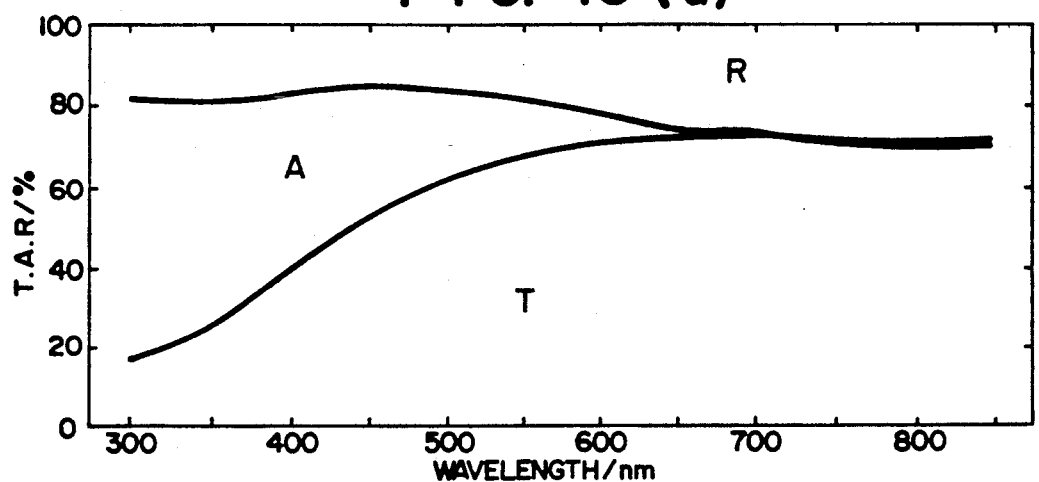
FIG. 16 (d)
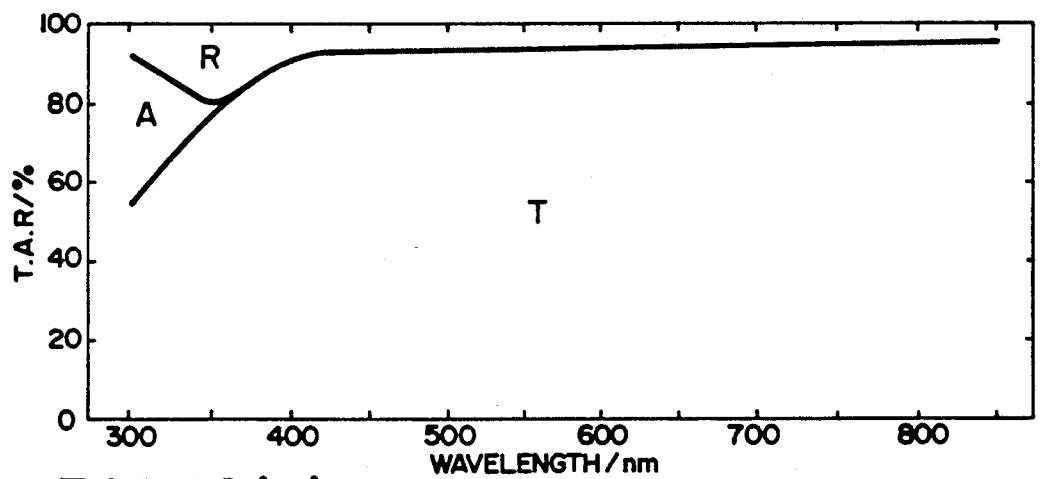
FIG. 16(e)
FIG. 17
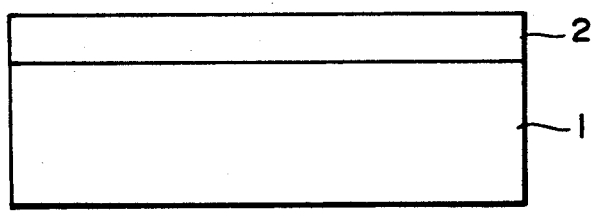
FIG. 18
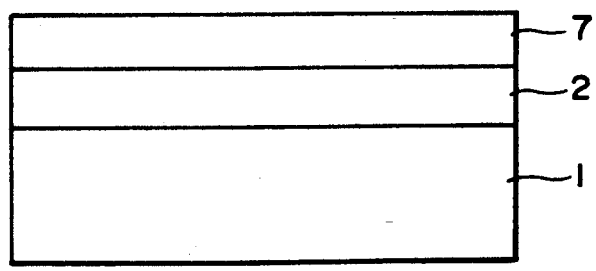

INFORMATION RECORDING MEDIUM

This application is a continuation-in-part of Application Ser. No. 07/289,001, filed Dec. 22, 1988, now abandoned.

BACKGROUND OF THE INVENTION

This invention relates to an information recording medium which is applicable to an optical memory element, an optical disk, an optical card, an optical document and image filing system, and the like.

Heretofore, metallic films of Al, Cr, Cu, Au, Ni, Ti and Bi, reported in The Industrial Daily News dated Apr. 14, 1987, and films of chalcogens or chalcogenated compounds such as Te and Te compounds, disclosed in M. Terao, et al.; J. Appl. Phys., 50, 6881 (1979), have been known as a write-once type recording medium of a heat mode memory type (a melting and evaporation type). However, such metallic films have a poor laser beam absorption efficiency. It is therefore necessary to apply a strong laser beam (100 mW) to the metallic film memory medium for a long time (1 μsec) when recording is performed. In particular, when recording is performed at high speed, the metallic film memory medium does not provide sufficient sensitivity for recording. Furthermore, when bits are formed on the metallic film memory medium, a protuberance is co-formed around each bit, and such protuberances increase noise when information is reproduced. In addition to the above, a vacuum evaporated film of a chalcogenated compound has the shortcoming of being readily deteriorated by heat and humidity.

Films of chalcogen compounds such as Te and Te compounds have been known as being usable as information recording media of a phase transition type [S. R. Ovshinsky; Appl. Phy's. Lett., 18, 254 (1971)]. However, the above films show only a small change in reflectivity of about 10% during recording, so that poor contrast is obtained.

As an optical memory medium of a bubble mode type, a sputtered film of In-CH$_4$-O$_2$ has been known [Takeoka et al; Optical Memory Symposium '85, 39 (1985)]. The constituent element In, however, is readily oxidized. In addition, In or In$_2$O$_3$ and an organic component exist separately in the film as a cluster, so that the film becomes unstable in the course of preservation for a long time or under highly humid conditions. Further, since the protuberance of the bubbles formed on the memory medium is as small as 1000 Å, high contrast cannot be obtained.

Further chalcogenated-compound-deposited films utilizing a phase transition between one crystal phase and another crystal phase or between a crystal phase and an amorphous phase are known as information recording media which are capable of recording and reproducing information and erasing recorded information. Unlike magneto-optical recording media, the phase transition type information recording media are capable of overwriting by the application of a single beam, and therefore an optical system for driving the recording medium is simple in mechanism. Thus, recently research and development activities are actively directed to the phase transition type information recording medium. Representative examples of the materials for use in the phase transition type information recording media are Ge-Te, Ge-Te-Sb, Ge-Te-S, Ge-Se-S, Ge-Se-Sb, Ge-As-Se, In-Te, Se-Te and Se-As as disclosed in U.S. Pat. No. 3,530,441.

For improvement of the stability and high speed crystallization of the material for use in the recording media, Au-added Ge-Te is proposed in Japanese Laid-Open Patent Application 61-219692, Sn-and-Au-added Ge-Te in Japanese Laid-Open Patent Application 61-270190, and Pb-added Ge-Te in Japanese Laid-Open Patent Application 62-19490.

Furthermore, a Ge-Te-Se-Sb having a particular composition is proposed in an attempt of improvement of repeated recording and erasing performance in Japanese Laid-Open Patent Application 62-73438.

However, none of the above proposed phase transition type information recording media can satisfy all the necessary properties for rewritable information recording media. In particular, recording sensitivity, erasing sensitivity, the erasing ratio at the time of overwriting, and the life of recorded portions and unrecorded portions are still insufficient for use in practice, and these are very important problems to be solved.

Of the above various problems, the extension of the life of recorded portions and unrecorded portions is the most important target to be cleared in both write-once type information recording media and rewritable type recording media.

In order to clear this target, an information recording medium comprising a transparent matrix and a light absorbing material dispersed in the transparent matrix is proposed.

As the materials for the matrix, oxides of Si, Al, Ti and Mg are disclosed in Japanese Laid-Open Patent Application 57-208648. Furthermore, in Japanese Laid-Open Patent Application 63-173240, metallic oxides, metallic nitrides, metallic sulfides, and metallic carbonates having small heat conductivities, such as SiO$_2$, SiO, Si$_3$N$_4$, TiO$_2$, ZnS, ZnO, Al$_2$O$_3$, AlN, MgO, GeO, SiC, ZrO$_2$ and Nb$_2$O$_5$, are proposed. However, the matrixes made of these inorganic materials have the drawbacks that the growth of crystal nuclei or crystals occurs during repeated information recording and erasing cycles, resulting in imperfect erasing and reduction of the C/N ratio caused by grain boundary noise.

Furthermore, organic materials for use in such matrixes as proposed in Japanese Laid-Open Patent Applications 60-124038, 63-205832 and 63-206921. In these references, a method of fabricating information recording media by simultaneous sputtering of a metal such as Te and a heat resistant resin is described. In Technical Report CPM83-58 published by The Institute of Electronics and Communication Engineers, a method of fabricating information recording media by reactive sputtering of Te and CH$_4$ is described. However, both of the above methods have the shortcoming that it is extremely difficult to control the particle size and dispersing state of the materials to be dispersed, such as Te. When an organic matrix is prepared by sputtering, the pressure of the reaction atmosphere is about 10$^{-2}$ Torr, so that the coagulation of the dispersed material is inevitable and it is extremely difficult to disperse the material in a finely-divided state.

In the case where only organic metallic compounds are employed as starting materials for the preparation of a recording layer of an information recording medium by a glow discharging decomposition method, it is almost impossible to prepare a recording layer including a transition metal because stable organic metallic compounds containing transition metals are rarely available.

SUMMARY OF THE INVENTION

It is therefore an object of the present invention to provide a highly stable information recording medium which is capable of recording information with high contrast and high C/N value, causes no environmental pollution, and is prepared inexpensively.

The above object of the present invention can be attained by an information recording medium which comprises a substrate and a recording film layer formed thereon comprising a hydrocarbon polymer and finely-divided particles of a metallic component dispersed therein, which recording film layer is a plasma polymerized film prepared by subjecting an organic metallic complex to glow discharging decomposition. The metallic component for use in the recording film layer may be a metal, a metallic oxide or a composition of a metal and a metallic oxide.

This invention is based on the discovery that the above metallic components can be uniformly dispersed in a finely-divided state in the recording film layer when they are dispersed by subjecting the corresponding organic metallic complexes to glow discharging decomposition.

In the present invention, when a metal is employed as the metallic component in the recording film layer, information is recorded by applying laser beams thereto to form protuberances in the recording film layer corresponding to the recorded information, while when a metallic oxide or a mixture of a metal and a metallic oxide is employed as the metallic component, information is recorded by applying electron rays to reduce the metallic oxide to the metal to produce a recorded area and a non-recorded area having different reflectivities in the recording film layer, and the recorded information can be erased by subjecting the recording film layer to a heat treatment, so that reversible recording and erasing of information can be attained.

BRIEF DESCRIPTION OF THE DRAWINGS

In the drawings,

FIG. 1 is a schematic cross-sectional view of an information recording medium according to the present invention.

FIG. 2 is a diagrammatic diagram of an apparatus for a plasma enhanced CVD process.

FIGS. 16(a), 16(b), 16(c), 16(d) and 16(e) are graphs showing the relationships between the transmittance, absorption, and reflectivity of the recording mediums according to the present invention FIG. 17 is a schematic cross-sectional view of another example of an information recording medium according to the present invention.

FIG. 18 is a schematic cross-sectional view of a further example of an information recording medium according to the present invention.

DETAILED DESCRIPTION AND THE PREFERRED EMBODIMENTS

Figure 3:
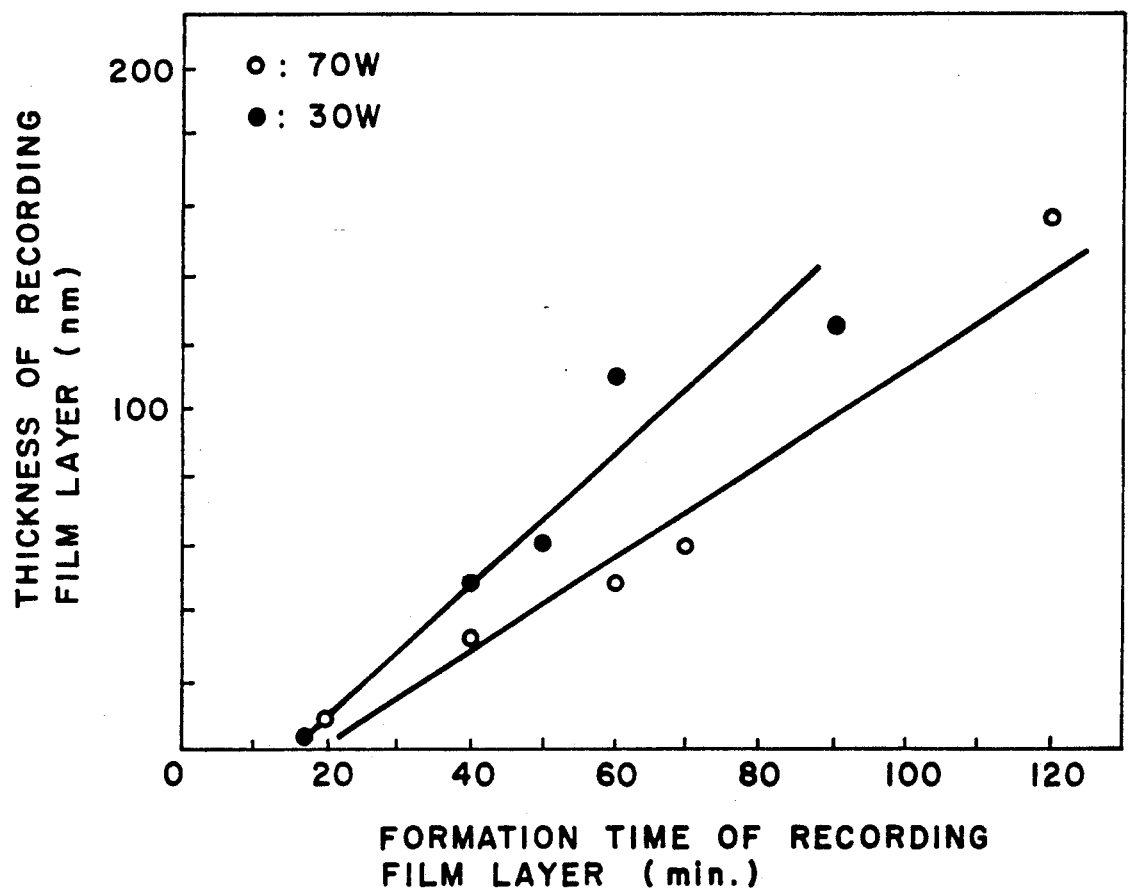
FIG. 3 is a graph showing the relationship between the forming time of a copper acetylacetonate (hereinafter referred to as "CuAA") film by a plasma enhanced CVD process and the thickness of the film.

The recording layer of the information recording medium according to the present invention can be formed on a substrate in a vacuum reactor by subjecting an organic metallic complex to glow discharging decomposition to form a plasma polymerized film on the substrate.

The glow discharging decomposition method for use in the present invention includes direct current and alternate current glow discharge decomposition methods. A representative example of such glow discharge decomposition methods is a plasma CVD method, and a representative example of the alternate current glow discharge decomposition method is a RF glow discharge decomposition method. Of the above methods, the RF glow discharge decomposition method is particularly preferable for use in the present invention.

Representative conditions for preparing the recording layer of the information recording medium according to the present invention by the RF glow discharge decomposition method are as follows:

(1) Temperature in the vacuum reactor: temperatures at which the vapor pressure of an organic metallic complex used as a starting material for the preparation of a plasma polymerized film serving as the recording layer is maintained in a range of approximately $10^{-3}$ Torr to 100 Torr.

(2) RF frequency: 100 KHz to 50 MHz, preferably 13.56 MHz.

(3) RF power: 1 to 500 W, preferably 5 to 200 W.

(4) Reaction pressure: 0.001 to 10 Torr, preferably 0.05 to 2 Torr.

(5) Discharging Time: 1 to 200 minutes, preferably 2 to 180 minutes.

(6) Temperature of Substrate: −50 to 350° C., preferably 0 to 200° C.

In the above RF glow discharge decomposition method, the recording layer can be formed with the temperature of the substrate either maintained at a constant temperature or changed stepwise as long as the temperature of the substrate is within the above-mentioned range. As a carrier gas, He, Ne, Ar, and $N_2$ may be used, and $O_2$, CO, $CO_2$, $CH_4$, and $C_2H_4$ can be used as a reacting gas, if necessary.

Although the recording layer may have any thickness in the present invention, a preferable range of the thickness is 50 Å to 5 μm, more preferably 100 Å to 2 μm.

It is preferable that the content of the metallic component in the recording layer be in the range of 5% to 95%, more preferably in the range of 20% to 80%. It is preferable that the hydrocarbon polymer serving as the matrix of the recording layer be carbon-based materials, in particular, a highly-cross-linked hydrocarbon polymer, i-carbon, graphite, diamonds, and composites thereof. These carbon-based materials consist essentially of carbon, but may contain H, N, or 0.

It is preferable that the hydrocarbon polymer serving as the matrix of the recording material have a hardness of 100 kg/mm$^2$ or more, more preferably 500 kg/mm$^2$ to 7000 kg/mm$^2$, in terms of Vicker's hardness.

Finely-divided particles of iron, nickel, cobalt, copper and titanium can be incorporated in the recording layer of the information recording medium according to the present invention. In addition to the above, finely-divided particles of metallic oxides can also incorporated in the recording layer.

In particular, when CuO or $CuO_2$ is contained in a film-forming hydrocarbon polymer serving as the matrix of the recording layer, such copper oxides are reduced to metallic copper when irradiated with electron rays, and the reflectivity of the recording layer is remarkably increased. When the recording layer containing the above reduced metallic copper is subjected to a thermal treatment, the metallic copper is oxidized to CuO or $CuO_2$, and the recording layer returns to the initial state state prior to the irradiation with electron rays.

By use of the above property, a hydrocarbon polymer containing a copper oxide is applicable as a recording medium in which bits are formed by electron rays. In this case, electron rays of 3,000 to 4,000 μC/cm$^2$ may be applied. The initial percent transmission of the recording layer at a wavelength of 400 to 700 nm is 25% or more. When electron rays are directed onto the recording layer, the copper oxide contained in the recording layer is reduced to metallic copper. Consequently, the percent transmission of the recording layer drops to only several percent. When the recording layer is subjected to a thermal treatment in the air after recording, the recording layer returns to the initial state prior to the recording step.

The thermal treatment can be carried out, for instance, at 200° C. for less than 5 minutes, or below 200° C. for 5 minutes or more. Under the above conditions, copper can be reduced to a lower copper oxide.

By applying the above-described phenomenon, recording and erasing of bits in the recording layer are made possible. In the case where copper and copper oxides such as CuO and $CuO_2$ are used in combination, 10% or more of the oxides is preferably incorporated in the metal so that a sufficient contrast is obtained when irradiated with electron rays.

In the present invention, finely-divided particles of a metal such as iron, cobalt, nickel and titanium having a size of 1,000 Å or less, preferably 300 Å or less, are favorably used. In the case of finely-divided copper particles, the particle size thereof is preferably 1,000 Å or less, more preferably 200 Å or less.

Any materials are usable as a substrate on which the above recording layer is formed. For instance, various plastics such as polymethyl-methacrylate and polycarbonate, glass, ceramics and metals may be used. In the present invention, since the glow discharge decomposition method is employed for forming the recording layer on the substrate, the materials for the substrate may be plastics which are not very much heat resistant.

On the surface of the substrate, preformatting for address signals and pregrooving for guide grooves can be performed. The substrate can be made in any form such as a tape, disk, drum, belt and the like, depending on the purpose. Furthermore, the substrate can be coated with a thin layer of $SiO_4$ or $Si_3O_4$ when necessary.

The information recording medium of the present invention basically comprises a substrate and a recording layer formed thereon containing any of the above mentioned metallic components serving as a memory material, but can be provided with additional layers such as a protective layer comprising a compound such as $SiO_2$, $Si_3N_4$, SiC or AlN, an adhesive layer comprising, for instance, a ultraviolet-curing resin, a protective plate comprising polymethyl methacrylate, or a reflection layer made of Al, Cr or Au. Furthermore, in order to protect the recording medium from dust and scratches, the recording medium can also be fabricated with an air-sandwich structure.

An example of the information recording medium of the present invention which can be applied for an optical recording disk is shown in FIG. 1. The present invention is not limited to this example, but can be modified in any manner within the spirit of the present invention.

In FIG. 1, reference numeral 1 indicates a substrate. On the substrate 1, there is disposed a recording layer 2, which is protected by a pair of upper and lower protective layers 3 in such a fashion that the recording layer 2 is interposed between the pair of upper and lower protective layers 3. On the upper protective layer 3, a protective plate 4 is provided. In the recording layer 2, finely-divided particles of a metallic component 6 serving as a light absorbing material are uniformly dispersed in a carbon-based material 5 as shown in the figure.

The information recording medium of the present invention is prepared in the following manner.

An organic metallic complex containing at least one metal, used as a starting material, is subjected to a plasma enhanced CVD process in a vacuum reactor, so that a plasma polymerized film which serves as a recording layer is formed on a substrate placed in a vacuum reactor.

Examples of the starting material for the formation of the recording layer include iron-containing organic complexes, cobalt-containing organic complexes, nickel-containing organic complexes, copper-containing organic complexes, and titanium-containing organic complexes.

Specific examples of the iron-containing organic complexes are iron(III)acetylacetonate, ferrocene; and iron complexes containing a chelating agent such as tiron, ethylene diamine, 2,2'-dipyridine, 1,10-phenanthroline, dithiol, oxine, thioxine and 3-mercapto-p-cresol.

Specific examples of the cobalt-containing organic complexes include cobalt(II) acetylacetonate, cobalt-(III) acetylacetonate, cobaltcene; and cobalt complexes containing a chelating agent such as tiron, ethylene diamine, 2,2'-dipyridine, 1,10-phenanthroline, dithiol, oxine, thioxine and 3-mercapto-p-cresol.

Specific examples of the nickel-containing organic complexes include nickel acetylacetonate (hereinafter referred to as "NiAA"), and nickel complexes containing one or two chelating agents such as dimethylglyoxime, benzildioxime, cyclohexane-1,2-di-ondioxime, tiron, ethylenediamine, 2,2'-dipyridine, 1,10-phenanthroline, dithiol, oxine, thioxine and 3-mercapto-p-cresol.

Specific examples of the copper-containing organic complexes include copper acetylacetonate (CuAA), and copper complexes containing one or two chelating agents such as tiron, ethylenediamine, 2,2'-dipyridine, 1,10-phenanthroline, dithiol, oxine, thioxine and 3-mercapto-p-cresol.

Specific examples of the titanium-containing organic complexes include diisopropoxytitanium bis(acetylacetonate), and bis(acetylacetonate)titanium oxide.

In the present invention, it is preferable that the center metals coordinated in the organic metallic complexes used as the starting materials for preparing a plasma polymerized film serving as the recording layer have a standard electrode potential of $-0.5$ V or more at 25° C. Specific representative examples of such center metals are Fe, Co, Ni, Sn, Cu and Ag.

When information is recorded, recorded information is reproduced or erased by use of the information recording medium according to the present invention, electromagnetic waves including laser beams, electron rays, X rays, ultraviolet rays, visible rays, infrared rays and microwave. Of these electromagnetic waves, semiconductor laser beams are preferable for use with the information recording medium according to the present invention in view of the compact size of the apparatus for driving the recording medium.

The present invention is described by way of examples, which should not be construed as limiting the present invention.

EXAMPLE 1

Recording film layer No. 1 for use in the present invention was prepared by using copper acetylacetonate (CuAA) as a starting material by a plasma enhanced CVD process using an apparatus shown in FIG. 2.

In FIG. 2, reference numeral 1 indicates an RF electric source; reference numeral 2, a thermocouple; reference numeral 3, an RF electrode; reference numeral 4, a substrate; reference numeral 5, a starting material, which is CuAA in this example; reference numeral 6, a heater; reference numeral 7, a counter electrode; reference numeral 8, a vacuum gauge; reference numeral 9, an oil diffuser pump; reference numeral 10, an oil rotation pump; and reference numeral 11, a heater controlling unit.

FIG. 3 is a graph showing the relationship between the formation time of the recording film layer and the thickness of the recording film layer formed on a glass substrate by supplying plasma electric powers of 70 W and 80 W, under a CuAA partial pressure of 0.004 Torr. The thickness of the recording film layer linearly increases with the recording film layer formation time. The larger the supplied plasma electric power, the lower the recording film layer formation rate as shown in the graph in FIG. 3. In the graph, the initial 20-minute period is an inductive period during which the partial pressure of CuAA reaches 0.004 Torr.

Figure 4:
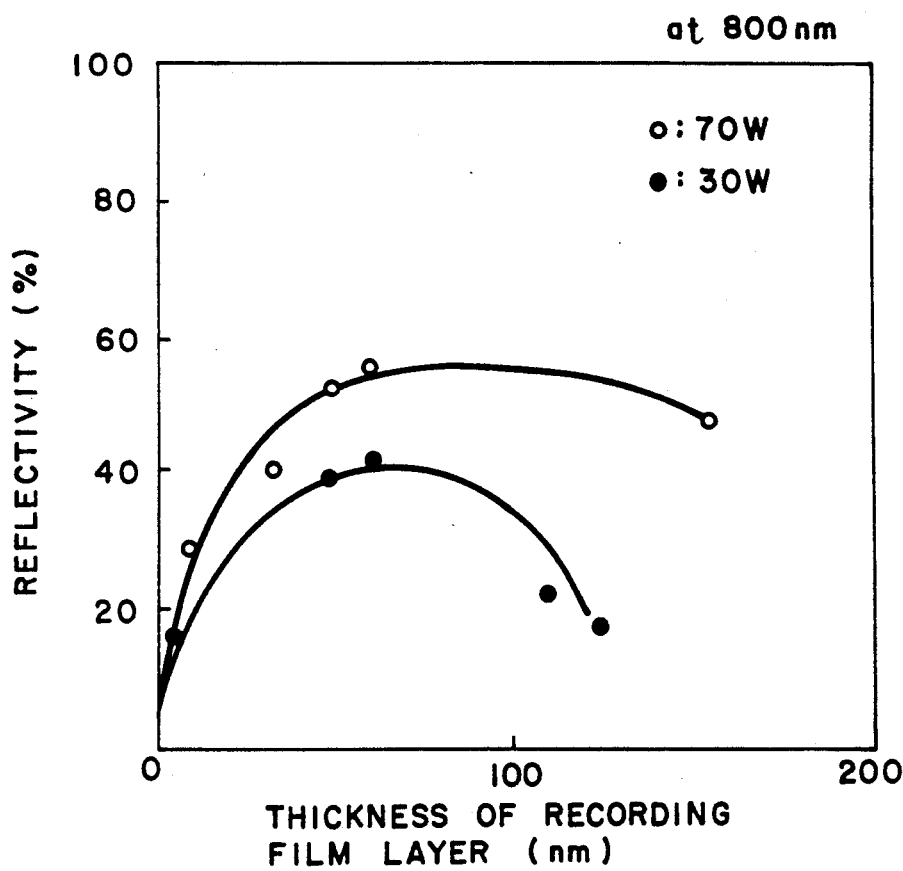
FIG. 4 is a graph showing the relationship between the thickness of a CuAA film formed by a plasma enhanced CVD process and the reflectivity of the film.
Figure 5:
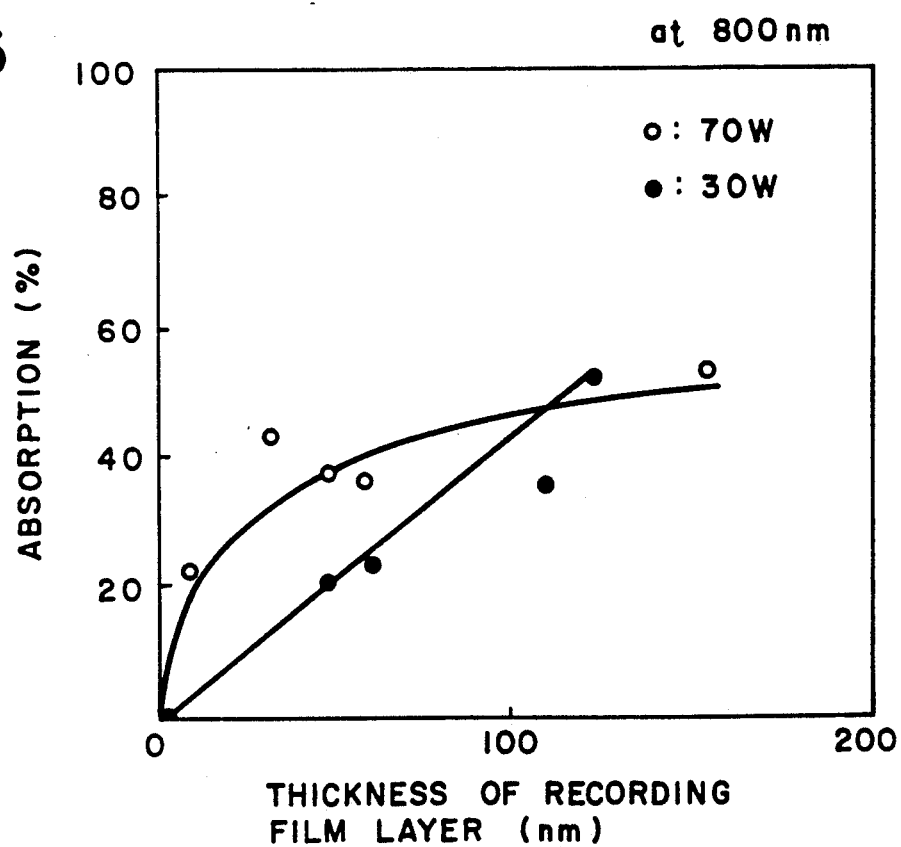
FIG. 5 is a graph showing the relationship between the thickness of a CuAA film formed by a plasma enhanced CVD process and the percent absorption of the film.
Figure 6:
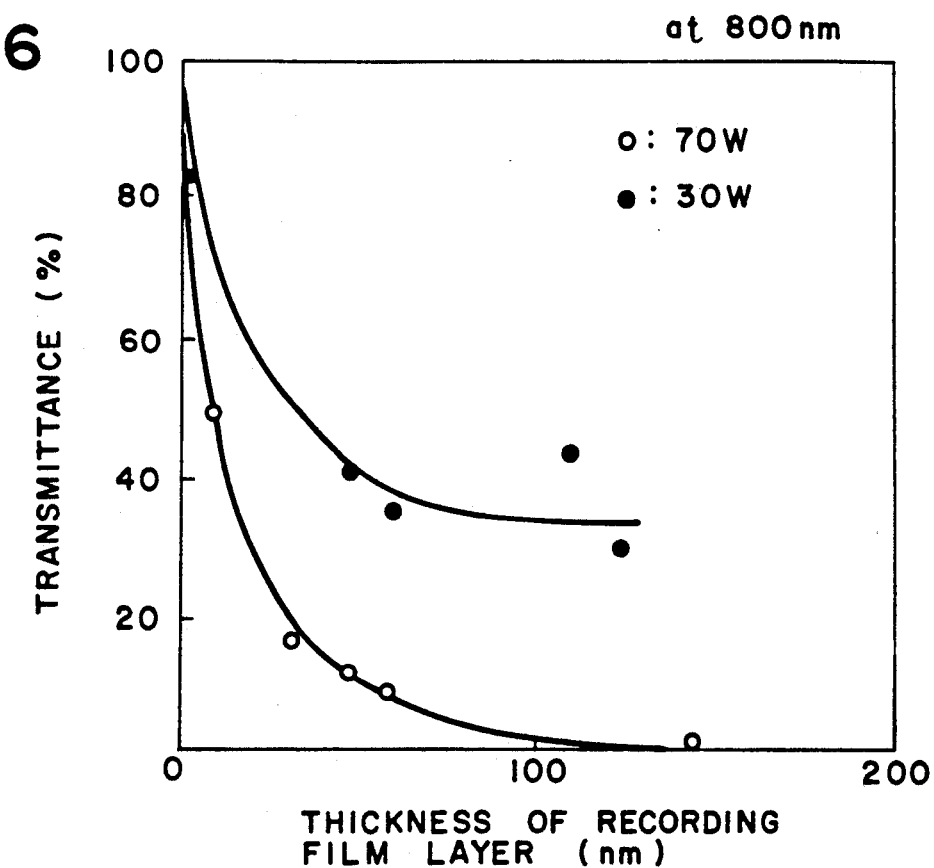
FIG. 6 is a graph showing the relationship between the thickness of a CuAA film formed by a plasma enhanced CVD process and the percent transmission of the film.
Figure 7:
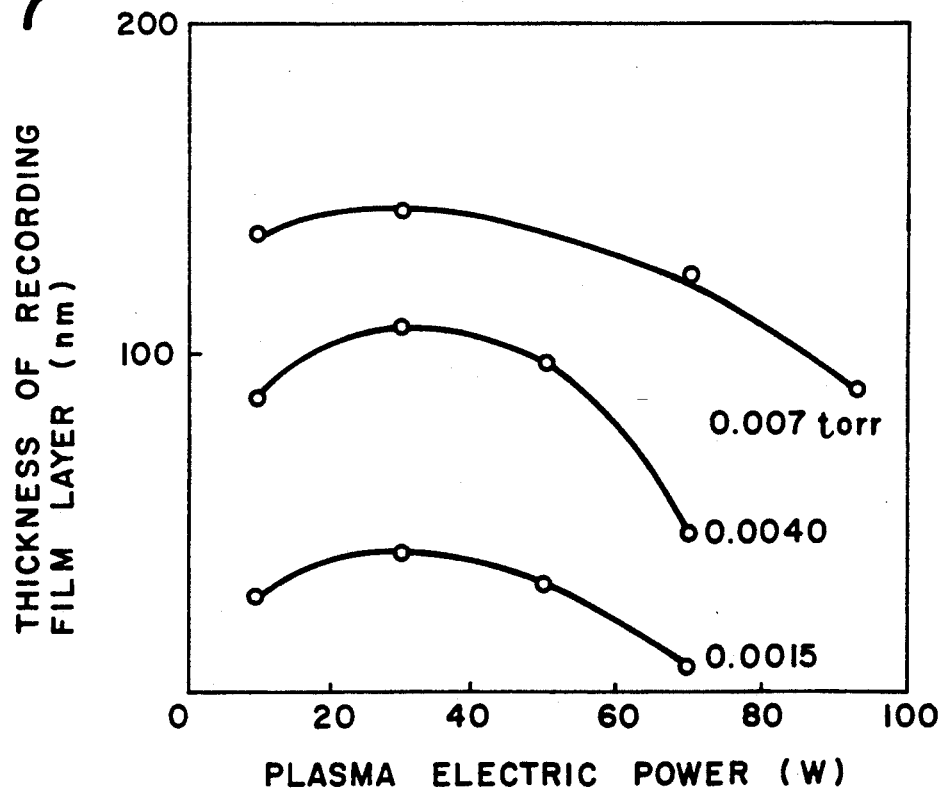
FIG. 7 is a graph showing the relationship between the supplied plasma electric power and the thickness of a CuAA film formed by a plasma enhanced CVD process.
Figure 8:
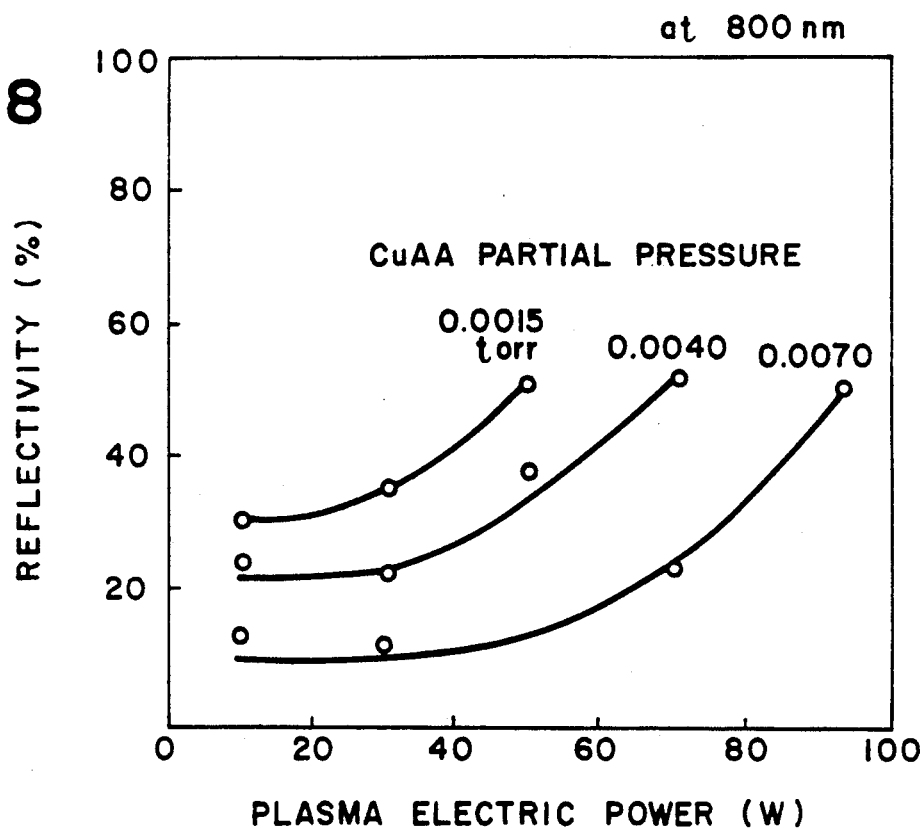
FIG. 8 is a graph showing the relationship between the supplied plasma electric power and the reflectivity of a CuAA film formed by a plasma enhanced CVD process.
Figure 9:
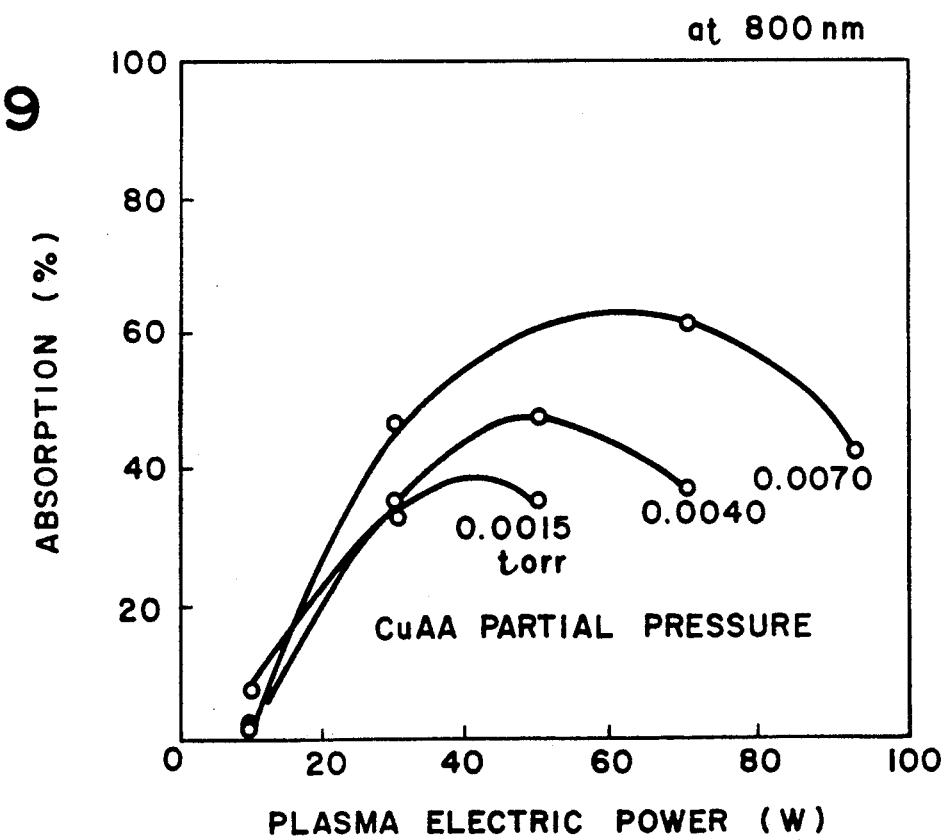
FIG. 9 is a graph showing the relationship between the supplied plasma electric power and the percent absorption of a CuAA film formed by a plasma enhanced CVD process.
Figure 10:
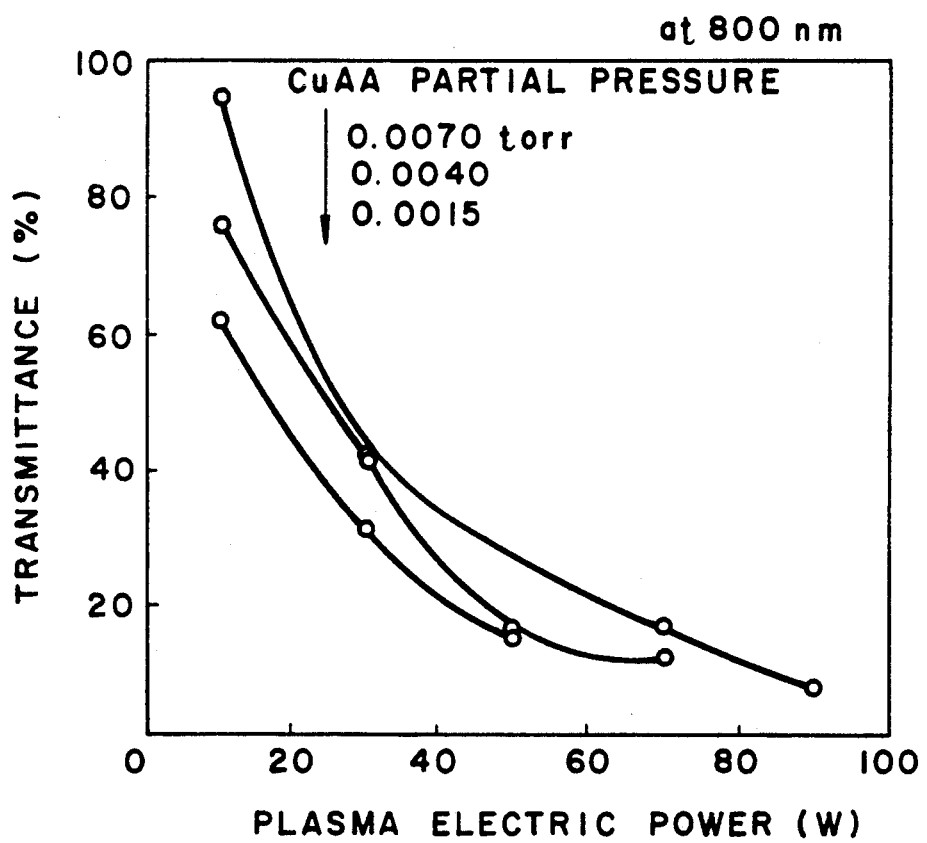
FIG. 10 is a graph showing the relationship between the supplied plasma electric power and the percent transmission of a CuAA film formed by a plasma enhanced CVD process.

FIGS. 4 to 6 are graphs showing the relationships between the reflectivity, absorption and transmittance, at a wavelength of 800 nm, of a CuAA recording film layer formed by the plasma enhanced CVD process, and the thickness of the recording film layer, respectively. The thickness of the recording film layer is changeable by controlling the recording film layer formation time. The reflectivity, absorption and transmittance are controllable as desired within a range of 0 to 50% by changing the thickness of the recording film layer.

FIGS. 7 to 10 are graphs showing the relationships between the thickness of the recording film layer, reflectivity, absorption and transmittance, at a wavelength of 800 nm, and plasma electric power and CuAA partial pressure, respectively. The formation time of the recording film layers was 60 minutes. The lower the CuAA partial pressure and the higher the supplied plasma electric power, the higher the reflectivity of the formed recording film layer. The absorption curve for each recording film layer has a maximum value when a particular amount of plasma electric power is supplied during the formation of the recording film layer.

As is clearly understood from the above, a recording film layer having the desired reflectivity and absorption is obtainable by properly selecting the conditions for forming the recording film layer.

It was confirmed by IR and XPS spectra (spectra by X-ray photoelectron spectroscopy) that each recording film layer essentially consists of a metallic copper and a hydrocarbon polymer represented by the formula $-(CH_2)_n-$. Oxygen was also found in an amount of 0.5 wt.% in the recording film layer. By the investigation using a Transmission Electron Microscope (hereinafter referred to as the TEM), it was confirmed that the finely-divided copper particles having a particle size of 40 to 160 Å are contained in the recording film layer and were covered with the hydrocarbon polymer at a depth of 10 Å from the surface of the recording film layer.

The optical recording performance of the above prepared recording film layer was evaluated under the following conditions:

| | |
|---|---|
| Material of Disk Substrate: | Polycarbonate |
| Rotational Speed of Disk: | 900 rpm |
| Linear Velocity of Beams: | 6 m/s |
| Wavelength of Beams: | 830 nm |
| Diameter of Beams: | 1 μm |

In the case where a CuAA recording film layer prepared by the plasma enhanced CVD process, having a thickness of 500 Å, a reflectivity of 50% and an absorption of 40%, was used as an information recording medium, information can be recorded on the recording medium by supplying any of beam powers of 3 mW, 5 mW, 7 mW and 9mW, and it was confirmed by an optical microscope that the reflectivity of the recording medium was clearly changed after recording.

By use of SEM (Scanning Electron Microscope), protuberances having heights of 2,000 Å, 3,500 Å, 3,500 Å and 4,500 Å were found on the recording media on which information was recorded by supplying beam powers of 3 mW, 5 mW, 7 mW and 9 mW, respectively. These protuberances are formed when a relatively low molecular weight polymer of the hydrocarbon polymer covering the finely-divided metal particles is evaporated by the energy of laser beams. When recording was performed by supplying a beam power of 7 mW, the most desirable spherical recording protuberances were formed in the recording area. In the case of laser beam powers of 3 mW and 5 mW, bits were found on the surfaces of the protuberances. In the case of a beam power of 9 mW, some pin holes were found in the surfaces of the protuberances.

When a CuAA recording film layer, prepared by a plasma enhanced CVD process, having a thickness of 1,200 Å, a reflectivity of 20% and an absorption of 60%, was used as the information recording medium, information was not recorded by a beam power of 3 mW, however, when beam powers of 5 mW, 7 mW and 9 mW were applied, recording was possible, and it was confirmed by an optical microscope that the reflectivity of the recording medium was clearly changed after recording.

By the SEM, it was confirmed that the protuberances of 1,500 Å were formed in the recorded area by supplying beam powers of 5 mW and 7 mW, and protuberances of 3,000 Å were formed by supplying a beam power of 9 mW. No pin holes were found in any of the surfaces of the protuberances.

EXAMPLE 2

The procedure for Example 1 was repeated except that the starting material, CuAA, employed in Example 1 was replaced by a compound represented by the following formula, whereby a recording film layer No. 2 for use in the present invention was formed:

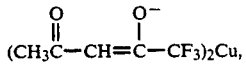

The thus prepared recording film layer was evaluated in the same manner as in Example 1. As a result, it was found that the properties of recording film layer No. 2 are identical to those of recording film layer No. 1 prepared in Example 1.

EXAMPLE 3

The procedure for Example 1 was repeated except that the starting material, CuAA, employed in Example 1 was replaced by copper ethylenediamine bisacetylacetonate represented by the formula of $Cu(C_{12}H_{18}N_2O_2)$, whereby recording film layer No. 3 for use in the present invention was prepared.

The thus prepared film layer was evaluated in the same manner as in Example 1. As a result, it was found that the properties of recording film layer No. 3 are identical to those of recording film layer No. 1 prepared in Example 1.

EXAMPLE 4

By using nickel acetylacetonate as the starting material, recording film layer No. 4 for use in the present invention was prepared by the plasma enhanced CVD process under the following conditions:

Apparatus: Apparatus for the plasma enhanced CVD process shown in FIG. 2
Substrates: Slide glass, Si wafer, polyethylene terephthalate, polycarbonate
Temperature of Substrate: 70° C.
Reaction Pressure: $5.0 \times 10^{-3}$ Torr
Temperature of Heater: 65° C.
Supplied High-Frequency Electric Power: 100W, 13.56 MHz
Discharging Time: 60 minutes The above substrates were used for different purposes. For instance, slide glass was used for checking the reflectivity and transmittance of the recording film layer; Si wafer for checking the composition of the recording film layer; polyethylene terephthalate for the observation of the recording film layer by the TEM and polycarbonate for evaluating the entire performance of the information recording medium.

The above-obtained recording film layer has a thickness of 700Å, and a reflectivity of 55% and an absorption of 45% at a wavelength of 800 nm. It was confirmed by IR and XPS spectra that the recording film layer consists essentially of metallic nickel and a hydrocarbon polymer represented by the formula $-(CH_2-)_n-$.

By the TEM, it was confirmed that the finely-divided nickel particles have a particle size of about 200 Å and are covered with the hydrocarbon polymer in the recording film layer.

The optical memory performance of the above-prepared film layer was evaluated under the following conditions:

| | |
|---|---|
| Material of Disk Substrate: | Polycarbonate |
| Rotational Speed of Disk: | 900 rpm |
| Linear Velocity of Beams: | 6 m/s |
| Wavelength of Beams: | 830 nm |
| Diameter of Beams: | 1 μm |
| Beam Power: | 5 mW |

It was confirmed by an optical microscope that the reflectivity of the recorded area was clearly changed after recording. By the SEM, it was further confirmed that the recorded area has smooth spherical protuberances with a height of 8,000 Å, and the non-recorded area also has a very smooth surface.

EXAMPLE 5

The procedure for Example 4 was repeated except that the starting material, nickel acetylacetonate, employed in Example 4, was replaced by a dimethylglyoxime nickel complex, whereby recording film layer No. 5 for use in the present invention was prepared.

The thus prepared recording film layer was evaluated in the same manner as in Example 4. As a result, it was found that the properties of recording film layer No. 5 are identical to those of recording film layer No. 4 prepared in Example 4.

EXAMPLE 6

The procedure for Example 4 was repeated except that the plasma electric power of 100 W employed in Example 4 was decreased to 50 W, whereby recording film layer No. 6 for use in the present invention was prepared.

The thus prepared film layer has a thickness of 1,000 Å, and a reflectivity of 40% and an absorption of 60% at a wavelength of 800 nm. It was also confirmed that the properties of recording film layer No. 6 are identical to those of recording film layer No. 4 prepared in Example 4.

EXAMPLE 7

The procedure for Example 4 was repeated except that the plasma electric power of 100 W employed in Example 4 was decreased to 30 W, whereby recording film layer No. 7 for use in the present invention was prepared.

The thus prepared film layer has a thickness of 1,500 Å, and a reflectivity of 20% and an absorption of 80% at a wavelength of 800 nm. It was also confirmed that the properties of recording film layer No. 7 are identical to those of recording film layer No. 4 prepared in Example 4.

EXAMPLE 8

Figure 11:
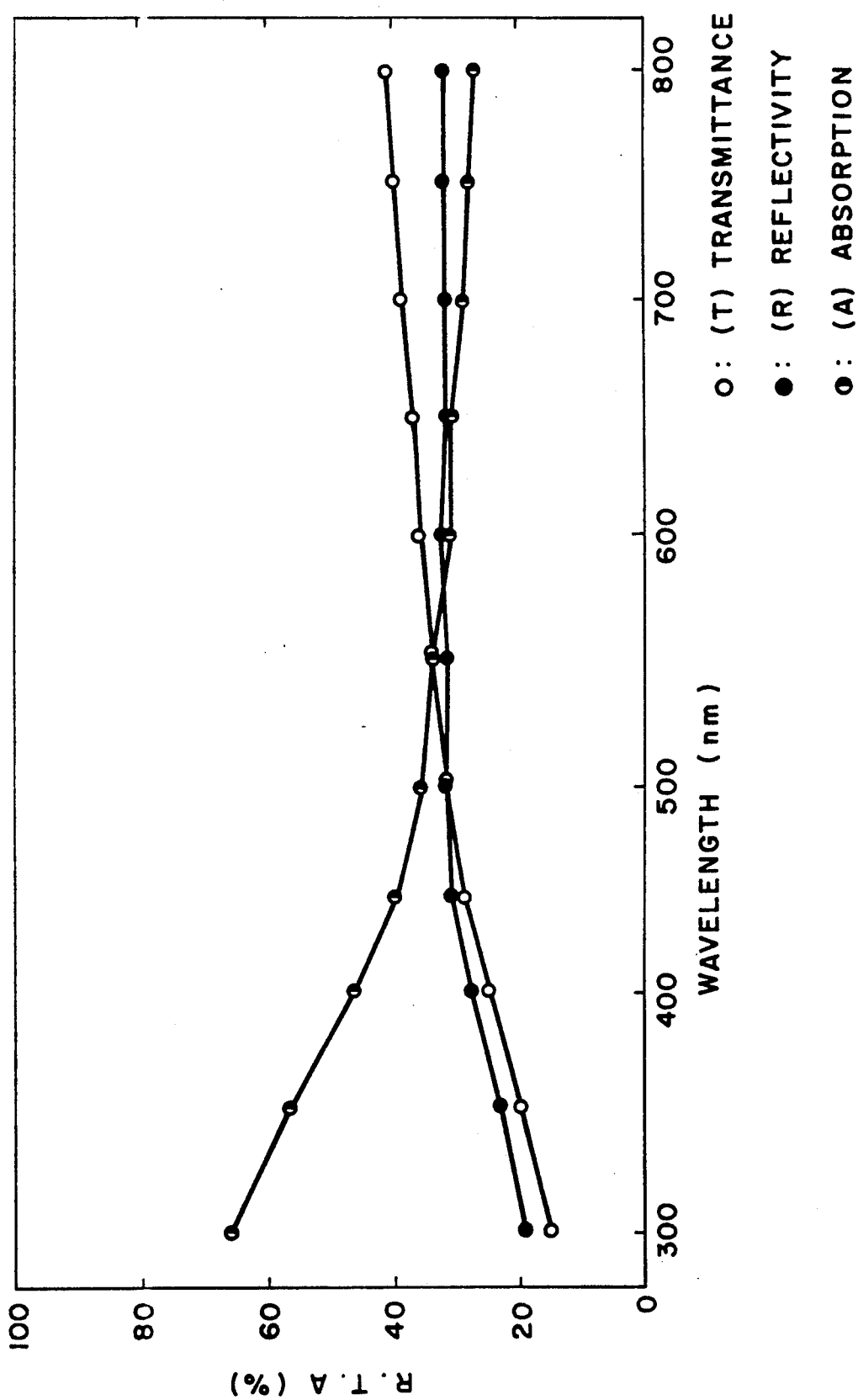
FIG. 11 is a graph showing the percent transmission, reflectivity and percent absorption of Co(II) acetylacetonate film formed by a plasma enhanced CVD process (Example 8).

By using cobalt(II) acetylacetonate as the starting material, recording film layer No. 8 for use in the present invention was prepared by the plasma enhanced CVD process under the following conditions:
Apparatus: Apparatus for the plasma enhanced CVD process as shown in FIG. 2
Substrate: Slide glass, Si wafer, polyethylene terephthalate, polycarbonate
Temperature of Substrate: 25° C.
Partial Pressure of Cobalt(II) Acetylacetonate: $1.0 \times 10^{-3}$ Torr
Pressure at Reaction: $2.0 \times 10^{-3}$ Torr
Supplied High-Frequency Electric Power: 90 W, 13.56 MHz
Discharging Time: 120 minutes As shown in FIG. 11, the thus prepared recording film layer has a thickness of 440 Å, and a reflectivity of 32% and an absorption of 28% at a wavelength of 800 nm. It was confirmed by IR and XPS spectra that the recording film layer essentially consists of metallic cobalt and a hydrocarbon polymer represented by the formula $-(CH_2)_n-$. By the TEM, it was confirmed that the finely-divided cobalt particles have a particle size of about 200 Å and are covered with the hydrocarbon polymer layer in the recording film layer.

The optical memory performance of the above-obtained recording film layer was evaluated under the following conditions:

| Material of Disk Substrate: | Polycarbonate |
|---|---|
| Rotational Speed of Disk: | 900 rpm |
| Linear Velocity of Beams: | 6 m/s |
| Wavelength of Beams: | 830 nm |
| Diameter of Beams: | 1 μm |
| Beam Power: | 5 mW |

It was confirmed by an optical microscope that the reflectivity of the recorded area was clearly changed after recording. By the SEM, it was found that the recorded area has smooth spherical protuberances with a height of about 1,500 Å, and the non-recorded area also has a very smooth surface.

EXAMPLE 9

By using cobalt(III) acetylacetonate as the starting material, recording film layer No. 9 for use in the present invention was prepared by the plasma enhanced CVD process under the following conditions:
Apparatus: Apparatus for the plasma enhanced CVD process shown in FIG. 2
Substrate: Slide glass, Si wafer, polyethylene terephthalate, polycarbonate
Temperature of Substrate: 25° C.
Partial Pressure of Cobalt(III) Acetylacetonate: $1.0 \times 10^{-3} - 2.0 \times 10^{-3}$ Torr
Pressure at Reaction: $2.0 \times 10^{-3} - 3.0 \times 10^{-3}$ Torr
Supplied High-Frequency Electric Power: 90W, 13.56 MHz
Discharging Time: 180 minutes The thus prepared recording film layer has a thickness of 1,300 Å.

Figure 12:
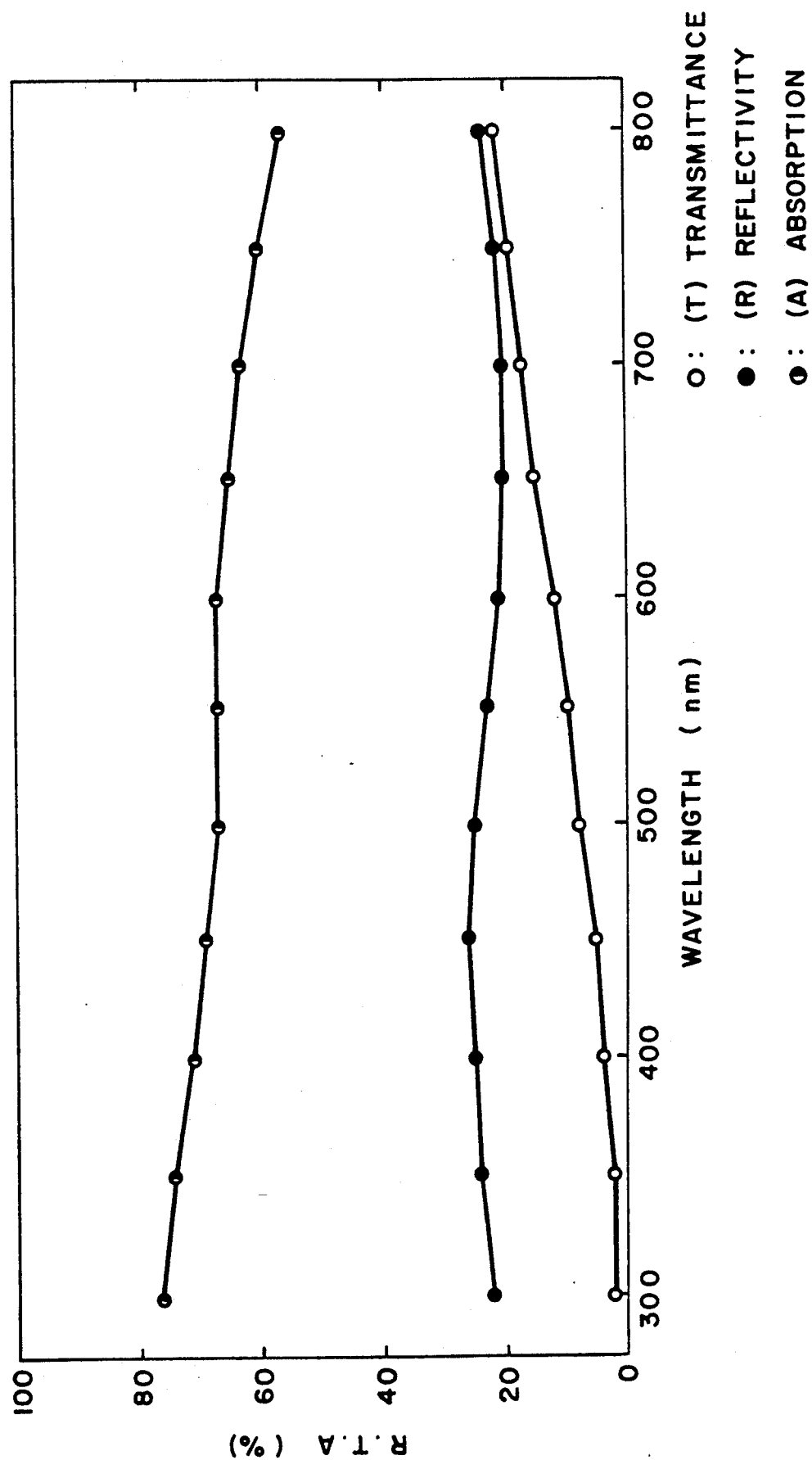
FIG. 12 is a graph showing the percent transmission, reflectivity and percent absorption of Co(III) acetylacetonate film formed by a plasma enhanced CVD process (Example 9).

As shown in FIG. 12, the recording film layer has a reflectivity of 23% and an absorption of 56% at a wavelength of 800 nm. It was confirmed by IR and XPS spectra that the recording film layer essentially consists of metallic cobalt and a hydrocarbon polymer represented by the formula $-(CH_2)_n-$. By the TEM, it was confirmed that the fine cobalt particles have a particle size of about 150 Å and are covered with the hydrocarbon polymer in the recording layer.

The optical memory performance of the above-prepared recording film layer was evaluated in the same manner as in Example 8.

It was confirmed by an optical microscope that the reflectivity of the recorded area was clearly changed after recording. By the SEM, it was found that the recorded area has smooth spherical protuberances with a height of about 3,000 Å, and the non-recorded area also has a very smooth surface.

EXAMPLE 10

By using cobalt(II) acetylacetonate as the starting material, recording film layer No. 10 for use in the present invention, was prepared by the plasma enhanced CVD process under the following conditions:
Apparatus: Apparatus for the plasma enhanced CVD process shown in FIG. 2
Substrate: Slide glass, Si wafer, polyethylene terephthalate, polycarbonate
Temperature of Substrate: 25° C.
Partial Pressure of Cobalt(II) Acetylacetonate: $2.0 \times 10^{-3}$ Torr
Pressure at Reaction: $3.0 \times 10^{-3}$ Torr
Supplied High-Frequency Electric Power: 90W, 13.56 MHz
Discharging Time: 70 minutes The thus prepared recording film layer has a thickness of 850 Å.

Figure 13:
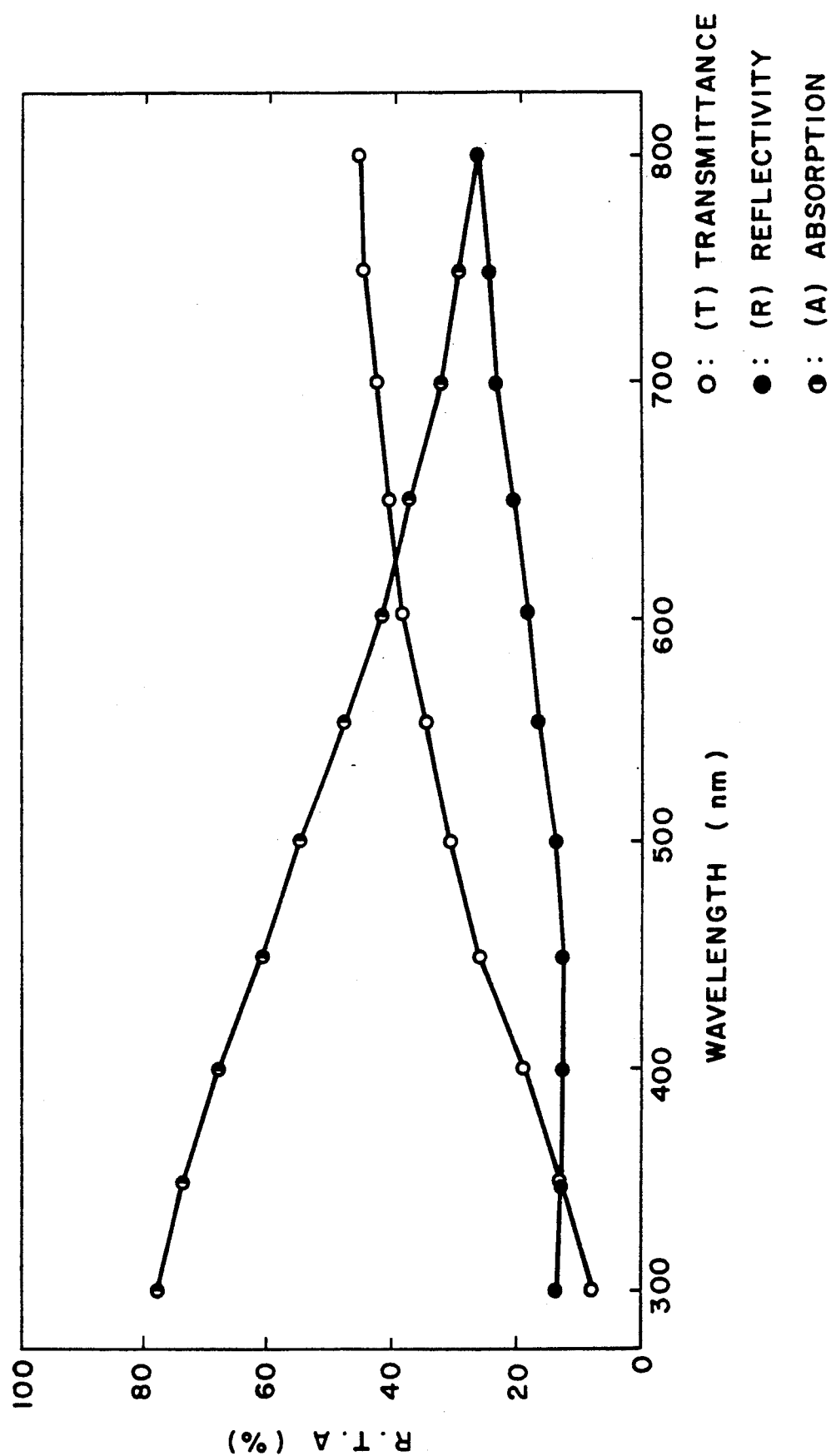
FIG. 13 is a graph showing the percent transmission, reflectivity and percent absorption of Co(II) acetylacetonate film formed by a plasma enhanced CVD process (Example 10).

As shown in FIG. 13, the recording film layer has a reflectivity of 27% and an absorption of 27% at a wavelength of 800 nm. It was confirmed by IR and XPS spectra that the above-obtained recording film layer consists essentially of metallic cobalt and a hydrocarbon polymer represented by the formula $-(CH_2)_n-$. By the TEM, it was confirmed that the finely-divided cobalt particles have a particle size of 50 to 150 Å and are covered with the hydrocarbon polymer in the recording film layer.

The optical memory performance of the above-prepared recording film layer was evaluated in the same manner as in Example 8.

It was confirmed by an optical microscope that the reflectivity of the recorded area was clearly changed after recording. By the SEM, it was found that the recorded area has smooth spherical protuberances with a height of about 2,000 Å, and the non-recorded area has also a very smooth surface.

EXAMPLE 11

By using bis(acetylacetonate)titanium oxide as the starting material, recording film layer No. 11 for use in the present invention was prepared by the plasma enhanced CVD process under the following conditions:

Apparatus: Apparatus for the plasma enhanced CVD process shown in FIG. 2
  Substrate: Slide glass, Si wafer, polyethylene terephthalate, polycarbonate
  Temperature of Substrate: 90° C.
  Partial Pressure of bis-acetylacetonate)titanium oxide: $1.0 \times 10^{-3}$ Torr
  Pressure at Reaction: $2.0 \times 10^{-3}$ Torr
  Supplied High-Frequency Electric Power: 100W, 13.56 MHz
  Discharging Time: 120 minutes The thus prepared recording film layer has a thickness of 400 Å, and a reflectivity of 45% and an absorption of 55% at a wavelength of 800 nm. It was confirmed by IR and XPS spectra that the above-obtained recording film layer essentially consists of metallic titanium and a hydrocarbon polymer represented by the formula $-(CH_2)_n-$. By the TEM, it was confirmed that the finely-divided titanium particles have a particle size of about 200 Å and are covered with the hydrocarbon polymer in the recording film layer.

The optical memory performance of the above-prepared recording film layer was evaluated under the following conditions.

| Material of Disk Substrate: | Polycarbonate |
|---|---|
| Rotational Speed of Disk: | 900 rpm |
| Linear Velocity of Beams: | 6 m/s |
| Wavelength of Beams: | 830 nm |
| Diameter of Beams: | 1 μm |
| Beam Power: | 5 mW |

It was confirmed by an optical microscope that the reflectivity of the recorded area was clearly changed after recording. By the SEM, it was found that the recorded area has smooth spherical protuberances with a height of about 1,500 Å, and the non-recorded area also has a very smooth surface.

EXAMPLE 12

By using iron (III) acetylacetonate as the starting material, recording film layer No. 12 for use in the present invention was prepared by the plasma enhanced CVD process under the following conditions:

Apparatus: Apparatus for the plasma enhanced CVD process shown in FIG. 2
  Starting Material: Iron (III) Acetylacetonate
  Substrate: Slide glass, Si wafer, polyethylene terephthalate, polycarbonate
  Temperature of Substrate: 90° C.
  Partial Pressure of Iron Acetylacetonate: $1.0 \times 10^{-3}$ Torr
  Flow Amount of Ar Gas: 10.0 SCCM
  Reaction Pressure: $5.0 \times 10^{-2}$ Torr
  Supplied High-Frequency Electric Power: 100W, 13.56 MHz
  Discharging Time: 120 minutes The thus prepared recording film layer has a thickness of 800 Å, and a reflectivity of 35% and an absorption of 65% at a wavelength of 800 nm. It was confirmed by IR and XPS spectra that the recording film layer essentially consists of metallic iron and a hydrocarbon polymer represented by the formula $-(CH_2)_n-$. By the TEM, it was confirmed that the finely-divided iron particles have a particle size of about 100 Å and are covered with the hydrocarbon polymer in the recording film layer.

The optical memory performance of the above-obtained recording film layer was evaluated under the following conditions:

| Material of Disk Substrate: | Polycarbonate |
|---|---|
| Rotational Speed of Disk: | 900 rpm |
| Linear Velocity of Beams: | 6 m/s |
| Wavelength of Beams: | 830 nm |
| Diameter of Beams: | 1 μm |
| Beam Power: | 5 mW |

It was confirmed by an optical microscope that the reflectivity of the recorded area was clearly changed after recording. By the SEM, it was found that the recorded area has smooth spherical protuberances with a height of about 1,500 Å, and the non-recorded area also has a very smooth surface.

EXAMPLE 13

By using ferrocene as starting material, recording film layer No. 13 for use in the present invention was prepared by the plasma enhanced CVD process under the following conditions:

Apparatus: Apparatus for the plasma enhanced CVD process shown in FIG. 2
  Substrate: Slide glass, Si wafer, polyethylene terephthalate, polycarbonate
  Temperature of Substrate: 50° C.
  Partial Pressure of Ferrocene: $2.0 \times 10^{-3}$ Torr
  Flow Amount of Ar Gas: 10.0 SCCM
  Reaction Pressure: $5.0 \times 10^{-2}$ Torr
  Supplied High-Frequency Electric Power: 70 W, 13.56 MHz
  Film Forming Time: 60 minutes The thus obtained recording film layer has a thickness of 1,100 Å, and a reflectivity of 30% and an absorption of 70% at a wavelength of 800 nm. It was confirmed by IR and XPS spectra that the recording film layer essentially consists of metallic iron and a hydrocarbon polymer represented by the formula $-(CH_2)_n-$. By the TEM, it was confirmed that the finely-divided iron particles have a size of about 150 Å and are covered with the hydrocarbon polymer in the recording film layer.

The optical memory performance of the above-obtained recording film layer was evaluated in the same manner as in Example 12.

It was confirmed by an optical microscope that the reflectivity of the recorded area was clearly changed after recording. By the SEM, it was found that the recorded area has smooth spherical protuberances with a height of about 3,000 Å, and the non-recorded area also has a very smooth surface.

EXAMPLE 14

By using copper acetylacetonate as the starting material, recording film layer No. 14 for use in the present invention was prepared by the plasma enhanced CVD process under the following conditions.

Figure 14:
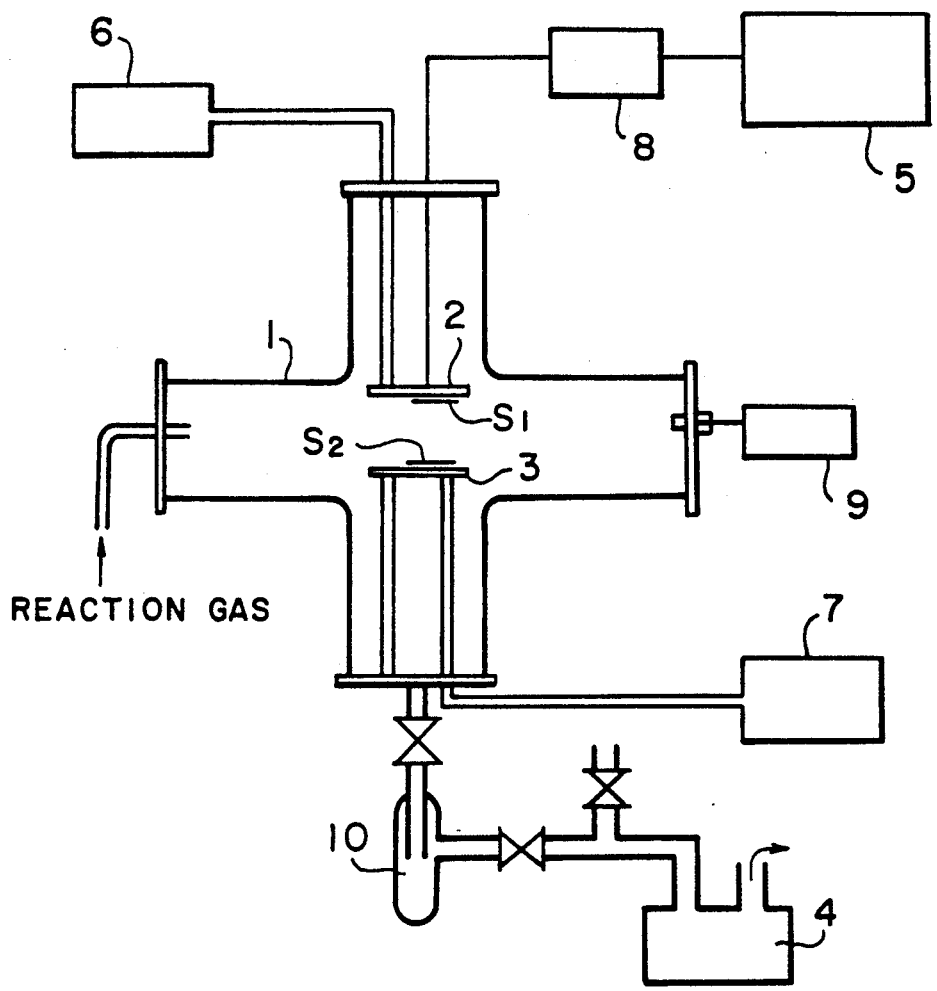
FIG. 14 is a schematic diagram of an apparatus for the plasma enhanced CVD process used in Examples 14 and 15.

Apparatus: Apparatus for the plasma enhanced CVD process shown in FIG. 14, in which reference numeral 1 indicates a plasma reactor, reference numerals 2 and 3 each indicate an RF electrode, reference numeral 4 indicates a vacuum pump, reference numeral 5 indicates an RF electrode, reference numerals 6 and 7 each indicate a controller for substrate temperature, reference numeral 8 indicates a matching box, reference numeral 9 indicates a vacuum gauge, reference numeral 10 indicates a trap, and symbols S1 and S2 each indicate a substrate.

Figure 15:
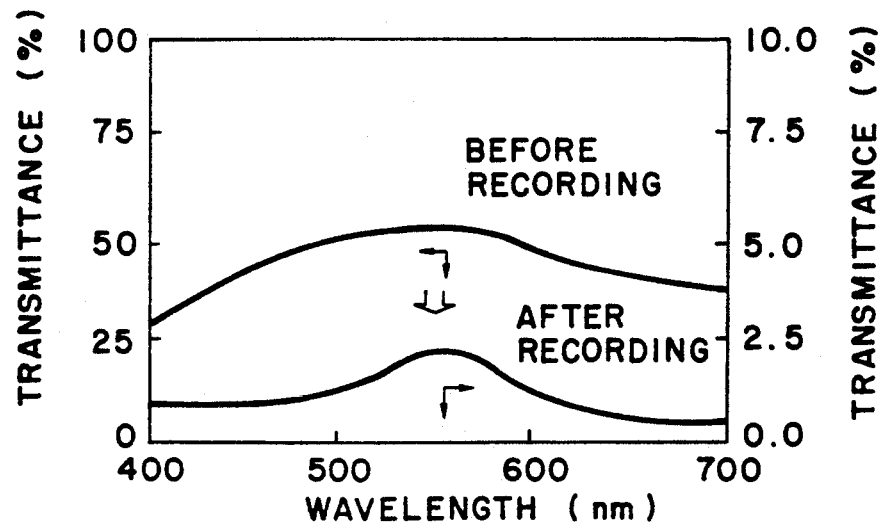
FIG. 15 is a graph showing percent transmissions, before and after recording, of the recording medium prepared in Example 14.

Substrate: Slide glass
Temperature of Substrate: 200° C.
Back Pressure: $1.0 \times 10^{-3}$ Torr or less
Temperature of Material: 100° C.
Supplied High-Frequency Electric Power: 100W, 13.56 MHz
Discharging Time: 10 minutes The thus prepared recording film layer has a thickness of 1,400 Å, and is yellow-green in color. According to an electron diffraction pattern thereof, the structure of the recording film layer is in the form of polycrystalline and comprises Cu, $Cu_2O$ and CuO. From XPS and FT-IR spectra, $—CH_2—$ groups were found in the recording film layer, which indicates the existence of a polymer in the recording film layer. As shown in FIG. 15, the transmittance of the film layer was 25 to 50% at a wavelength of 400 to 700 nm.

By applying electron rays of 3438 $\mu C/cm^2$, bits having a width of 10.0 $\mu m$ were clearly formed in the recording film layer. According to an observation by an optical microscope, the light was well reflected by the bits formed area, and extremely high contrast was obtained. At this moment, as shown in FIG. 15, the transmittance of the recording film layer dropped to 2.5% or less at a wavelength of 400 to 700 nm. The peak in the vicinity of 550 nm indicates the formation of metallic copper.

The recording film layer after formation of bits (after recorded) was subjected to a thermal treatment in air at 200° C. for 1 minute. The once formed bits were erased by the above treatment. It was possible to perform the above recording and erasing repeatedly.

Since recording proceeds from reduction of copper oxide, the area adjacent to the recorded area is not caused to rise, unlike a memory medium of a melting evaporation type, and is very smooth. Further, since the particles of Cu, $Cu_2O$ and CuO are covered with the hydrocarbon polymer, the recording and erasing stabilities of the recording medium is significantly high.

In the case where the temperature of the substrate is in a range of 100 to 250° C., the amount of formed copper oxides is such that recording by irradiating electron rays can be carried out.

EXAMPLE 15

The procedure for Example 14 was repeated except that the starting material employed in Example 14 was replaced by a compound represented by the formula

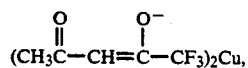

whereby recording film layer No. 15 for use in the present invention was prepared.

The thus prepared recording film layer was evaluated in the same manner as in Example 14. As a result, it was found that the properties of recording film layer No. 15 are identical to those of recording film layer No. 14 prepared in Example 14.

EXAMPLE 16

By using copper acetylacetonate as the starting material, recording film layer No. 16 for use in the present invention was prepared by the plasma enhanced CVD process under the following conditions:

Apparatus: Apparatus for the plasma enhanced CVD process shown in FIG. 2
Substrates: Slide glass, Si wafer, polyethylene terephthalate, polycarbonate
Temperature of Substrate: 25° C.
Reaction Pressure: $1.0 \times 10^{-2}$ Torr
Heating Temperature: 80° C.
Supplied High-Frequency Electric Power: 70 W, 13.56 MHz
Discharging Time: 60 minutes The above substrates were used for different purposes. For instance, slide glass was used for checking the reflectivity and transmittance of the recording film layer; Si wafer for checking the composition of the recording film layer; polyethylene terephthalate for the observation and polycarbonate for evaluating the entire performance of the information recording medium.

The above-obtained recording film layer has a thickness of 100 nm and a hardness of 2000 $kg/mm^2$ in terms of Vicker's hardness. It was confirmed by the Fourier Transformation Infrared Spectroscopy (hereinafter referred to as FTIR), XPS spectra and TEM that the recording film layer is a carbon-based thin film in which copper particles having a particle size of about 10 nm are uniformly dispersed. Furthermore, this recording film layer was analyzed by the high sensitivity differential thermal scanning calorimetric method (hereinafter referred to as DSC) and the thermogravimetric analysis (hereinafter referred to as TGA). The results indicate that an exothermic peak and a decrease in weight, which are considered to be caused by thermal decomposition, were observed in the heating process up to 250° C.

In order to evaluate the recording characteristics of this recording film layer, the same recording film layer as mentioned above was formed with a thickness of 100 nm on a pregrooved polycarbonate substrate under the same conditions as mentioned above, whereby an optical recording disk was made.

A laser beam was applied to this optical recording disk as it was rotated at a speed of rotation of 1800 rpm in such a fashion that the laser power on the recording film layer of the optical recording disk was 5 mW. As a result, it was confirmed that there was an obvious change in the reflectivity of the recording film layer after the application of the laser beam.

By the SEM, it was further confirmed that the recorded area has smooth bubbles with a height of 300 nm. The C/N ratio of the optical recording disk was s55 dB.

The reflectivity of the recording film layer immediately after the formation thereof was 65%, and no changes were observed in this reflectivity when the optical recording disk was allowed stand at 30° C., 90%RH for 300 days.

EXAMPLE 17

By using nickel acetylacetonate as the starting material, recording film layer No. 17 for use in the present invention was prepared by the plasma enhanced CVD process under the following conditions:

Apparatus: Apparatus for the plasma enhanced CVD process shown in FIG. 2
Substrates: Slide glass, Si wafer, polyethylene terephthalate, polycarbonate
Temperature of Substrate: 25° C.
Reaction Pressure: $1.0 \times 10^{-2}$ Torr
Heating Temperature: 80° C.
Supplied High-Frequency Electric Power: 70 W, 13.56 MHz
Discharging Time: 60 minutes The above substrates were used for different purposes. For instance, slide glass was used for checking the reflectivity and transmittance of the recording film layer; S1 wafer for checking the composition of the recording film layer; polyethylene terephthalate for the observation and polycarbonate for evaluating the entire performance of the information recording medium.

The above-obtained recording film layer has a thickness of 100 nm. It was confirmed by the FTIR, XPS spectra and the TEM that the recording film layer is a carbon-based thin film in which nickel particles having a particle size of about 5 nm are uniformly dispersed. Furthermore, this recording film layer was analyzed by DSC and TGA. The results indicate that an exothermic peak and a decrease in weight, which are considered to be caused by thermal decomposition, were observed in the heating process up to 250° C.

In order to evaluate the recording characteristics of this recording film layer, the same recording film layer as mentioned above was formed with a thickness of 100 nm on a pregrooved polycarbonate substrate under the same conditions as mentioned above, whereby an optical recording disk was made.

A laser beam was applied to this optical recording disk as it was rotated at a speed of rotation of 1800 rpm in such a fashion that the laser power on the recording film layer of the optical recording disk was 5 mW. As a result, it was confirmed that there was an obvious change in the reflectivity of the recording film layer after the application of the laser beam.

By the SEM, it was further confirmed that the recorded area has smooth bubbles with a height of 300 nm. The C/N ratio of the optical recording disk was 55 dB.

The reflectivity of the recording film layer immediately after the formation thereof was 40%, and no changes were observed in this reflectivity when the optical recording disk was allowed stand at 30° C., 90%RH for 300 days.

EXAMPLE 18

By using copper acetylacetonate (CuAA) as the starting material, recording film layer No. 18 for use in the present invention was prepared by the plasma enhanced CVD process under the following conditions:

Apparatus: Apparatus for the plasma enhanced CVD process shown in FIG. 2
Substrates: Slide glass, Si wafer, polyethylene terephthalate, pregrooved polycarbonate disk having a diameter of 3.5 inches
Temperature of Substrate: 25° C.
Reaction Pressure: $3.0 \times 10^{-3}$ Torr
Heating Temperature: 80° C.
Supplied High-Frequency Electric Power: 70 W, 13.56 MHz
Discharging Time: 60 minutes The above substrates were used for different purposes. For instance, slide glass was used for checking the reflectivity and transmittance of the recording film layer; Si wafer for checking the composition of the recording film layer; polyethylene terephthalate for the observation of the recording film layer by TEM and the optical disk made of polycarbonate for evaluating the entire performance of the information recording medium.

The above-obtained recording film layer has a thickness of 100 nm. It was confirmed by the FTIR, XPS spectra and the TEM that the recording film layer is a carbon-based thin film in which copper particles having a particle size of about 15 nm are uniformly dispersed. The recording film layer has a copper color. The standard electrode potential of copper at 25° C. is 0.34 V.

Figure 16A:
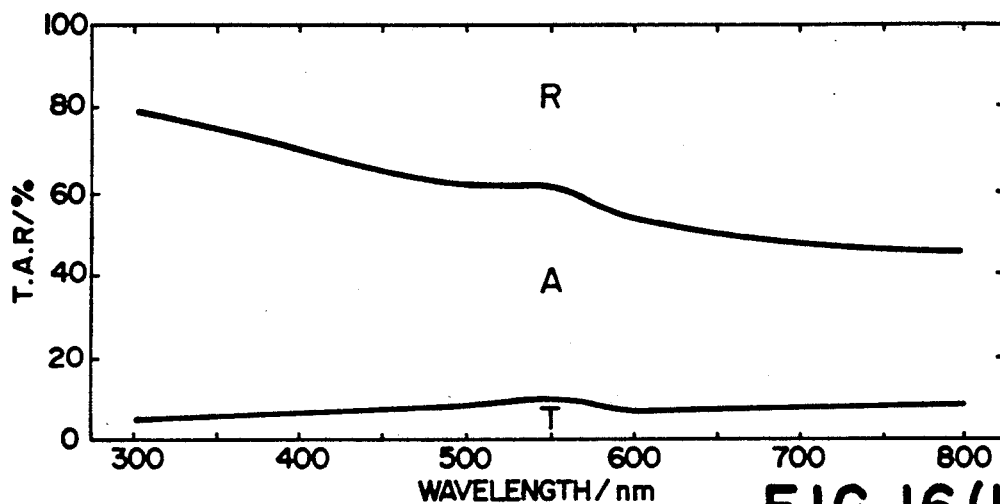
Figure 16B:
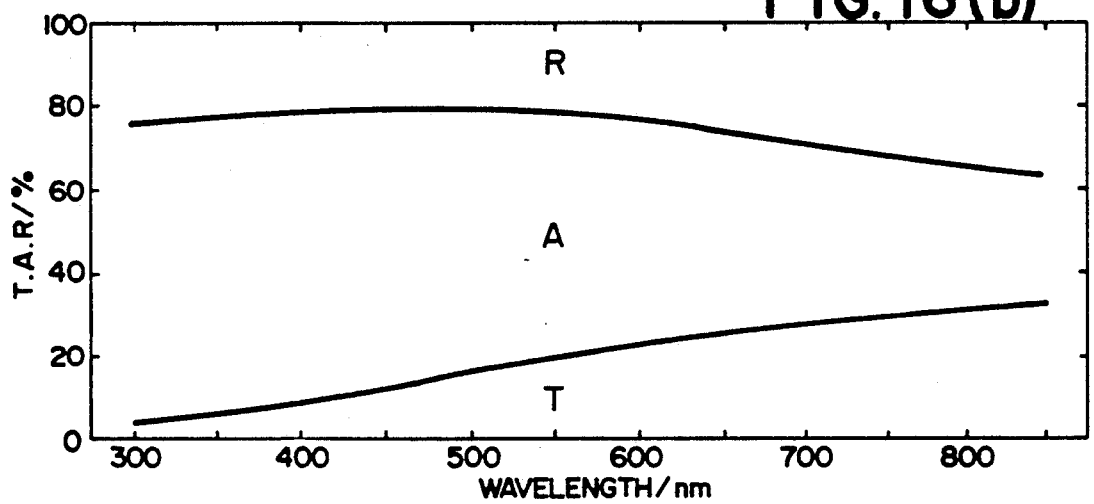

The optical characteristics, transmittance (T), absorption (A), and reflectivity (R), of this recording film layer are shown in FIG. 16(a).

In order to evaluate the recording characteristics of this recording film layer, the same recording film layer 2 as mentioned above was formed with a thickness of 100 nm on the above-mentioned pregrooved polycarbonate substrate 1 under the same conditions as mentioned above, whereby an optical recording disk was made as illustrated in FIG. 17.

A laser beam having a wavelength of 830 nm was applied with a frequency of 3.7 MHz to this optical recording disk as it was rotated at a line speed of 5.6 m/sec in such a fashion that the laser power on the recording film layer of the optical recording disk was 5 mW. As a result, it was confirmed that there was an obvious change in the reflectivity of the recording film layer after the application of the laser beam.

By the SEM, it was further confirmed that the recorded area has smooth bubbles. The C/N ratio of the optical recording disk was 50 dB.

EXAMPLE 19

The procedure for Example 18 was repeated except that the copper acetylacetonate (CuAA) employed as the starting material in Example 18 was replaced by nickel acetylacetonate (NiAA), whereby recording film layer No. 19 for use in the present invention was prepared.

The above-obtained recording film layer has a thickness of 100 nm. It was confirmed by the FTIR, XPS spectra and the TEM that the recording film layer is a carbon-based thin film in which nickel particles having a particle size of about 8 nm are uniformly dispersed. The recording film layer has a grey color. The standard electrode potential of copper at 25° C. is −0.28 V.

Figure 16C:
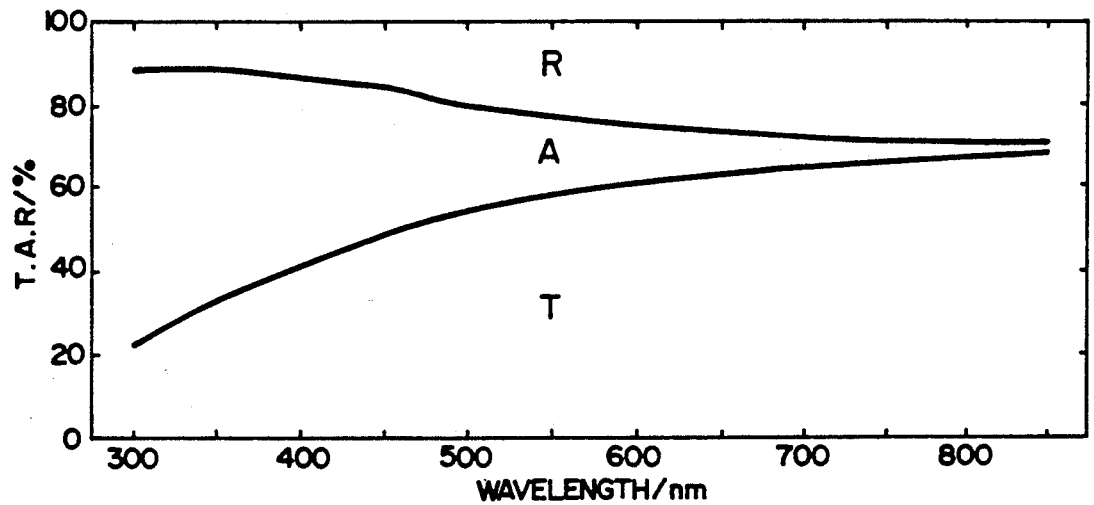

The optical characteristics, transmittance (T), absorption (A), and reflectivity (R), of this recording film layer are shown in FIG. 16(c).

In order to evaluate the recording characteristics of this recording film layer, the same recording film layer 2 as mentioned above was formed with a thickness of 100 nm on the same pregrooved polycarbonate substrate 1 as employed in Example 18 under the same conditions as in Example 18, whereby an optical recording disk was made as illustrated in FIG. 17.

A laser beam having a wavelength of 830 nm was applied with a frequency of 3.7 MHz to this optical recording disk as it was rotated at a line speed of 5.6 m/sec in such a fashion that the laser power on the recording film layer of the optical recording disk was 5 mW. As a result, it was confirmed that there was an obvious change in the reflectivity of the recording film layer after the application of the laser beam.

By the SEM, it was further confirmed that the recorded area has smooth bubbles. The C/N ratio of the optical recording disk was 50 dB.

EXAMPLE 20

The procedure for Example 18 was repeated except that the copper acetylacetonate (CuAA) employed as the starting material in Example 18 was replaced by cobalt acetylacetonate (CoAA), whereby recording film layer No. 20 for use in the present invention was prepared.

The above-obtained recording film layer has a thickness of 100 nm. It was confirmed by the FTIR, XPS spectra and the TEM that the recording film layer is a carbon-based thin film in which nickel particles having a particle size of about 6 nm are uniformly dispersed. The recording film layer has a dark brown color. The standard electrode potential of copper at 25° C. is −0.25 V.

The optical characteristics, transmittance T), absorption {A), and reflectivity (R), of this recording film layer are shown in FIG. 16(c).

In order to evaluate the recording characteristics of this recording film layer, the same recording film layer 2 as mentioned above was formed with a thickness of 100 nm on the same pregrooved polycarbonate substrate 1 as employed in Example 18 under the same conditions as in Example 18, and an aluminum layer 7 having a thickness of 50 nm was overlaid on the above recording film layer to form a composite recording film layer as illustrated in FIG. 18, whereby an optical recording disk was made.

A laser beam having a wavelength of 830 nm was applied with a frequency of 3.7 MHz to this optical recording disk as it was rotated at a line speed of 5.6 m/sec in such a fashion that the laser power on the recording film layer of the optical recording disk was 5 mW. As a result, it was confirmed that there was an obvious change in the reflectivity of the recording film layer after the application of the laser beam in the same manner as in Example 18.

By the SEM, it was further confirmed that the recorded area has smooth bubbles. The C/N ratio of the optical recording disk was 50 dB.

EXAMPLE 21

The procedure for Example 18 was repeated except that the copper acetylacetonate (CuAA) employed as the starting material in Example 18 was replaced by iron acetylacetonate (FeAA), whereby recording film layer No. 21 for use in the present invention was prepared.

The above-obtained recording film layer has a thickness of 100 nm. It was confirmed by the FTIR, XPS spectra and the TEM that the recording film layer is a carbon-based thin film in which nickel particles having a particle size of about 6 nm are uniformly dispersed. The recording film layer has a yellow color. The standard electrode potential of copper at 25° C. is −0.44 V.

The optical characteristics, transmittance (T), absorption (A), and reflectivity (R), of this recording film layer are shown in FIG. 16(d).

In order to evaluate the recording characteristics of this recording film layer, the same recording film layer as mentioned above was formed with a thickness of 100 nm on the same pregrooved polycarbonate substrate as employed in Example 18 under the same conditions as in Example 18, whereby an optical recording disk was made.

A visible gas-laser beam was applied this optical recording disk, and it was confirmed that there was an obvious change in the reflectivity of the recording film layer after the application of the gas-laser beam and therefore this recording disk can be used as information recording medium.

EXAMPLE 22

The procedure for Example 18 was repeated except that the copper acetylacetonate (CuAA) employed as the starting material in Example 18 was replaced by zinc acetylacetonate (ZnAA), whereby recording film layer No. 22 for use in the present invention was prepared.

The above-obtained recording film layer has a thickness of 100 nm. It was confirmed by the FTIR, XPS spectra and the TEM that the recording film layer is a carbon-based thin film. However, zinc particles were so small in size that they were not clearly observed. The recording film layer is transparent. The standard electrode potential of zinc at 25° C. is −0.76 V.

The optical characteristics, transmittance (T), absorption (A), and reflectivity (R), of this recording film layer are shown in FIG. 16(e).

EXAMPLE 23

The procedure for Example 18 was repeated except that the copper acetylacetonate (CuAA) employed as the starting material in Example 18 was replaced by zinc acetylacetonate (AlAA), whereby recording film layer No. 23 for use in the present invention was prepared.

The above-obtained recording film layer has a thickness of 100 nm. It was confirmed by the FTIR, XPS spectra and the TEM that the recording film layer is a carbon-based thin film. However, aluminum particles were so small in size that they were not clearly observed in the recording film layer. The recording film layer is transparent. The standard electrode potential of aluminum at 25° C. is −1.66 V.

The standard electrode potentials of Cu, Ni, Co and Fe are respectively 0.34 V, −0.25 V, −0.28 V and −0.44. In the recording film formation conditions in Examples 18 through 21, the particle sizes of these metals in the plasma polymerized recording film layers are respectively about 15 nm, 8 nm, 6 nm, and 2 nm, and the colors of these recording film layers are respectively copper color, dark brown, grey and yellow.

By contrast, the standard electrode potentials of Zn and Al are respectively −0.76 V and −1.66 V. In the recording film formation conditions in Examples 22 and 23, the particle sizes of these metals in the plasma polymerized recording film layers are so small that they cannot be clearly recognized.

Therefore, when recording and reproduction (or reading out) are performed by use of visible light, organic metal complexes including metals having a standard electrode potential of −0.5 V or more are preferable for use since clear-cut absorption and reflectivity can be more easily utilized in such organic metallic complexes.

ZnAA and AlAA can be used in the information recording medium according to the present invention.

EXAMPLE 24

The procedure for Example 19 was repeated except that the nickel acetylacetonate (NiAA) employed in Example 19 was replaced by nickel glyoxime, whereby recording film layer No. 24 for use in the present invention was prepared. The characteristics of the thus obtained recording film layer are the same as those of recording film layer No. 19 prepared in Example 19.

By use of the recording film layer No. 19, an optical recording disk was prepared in the same manner as in Example 19, the recording characteristics of the optical recording disk are the same as those of the optical recording disk prepared in Example 19.

EXAMPLE 25

The procedure for Example 21 was repeated except that the iron acetylacetonate (FeAA) employed in Example 21 was replaced by iron phenanthroline, whereby recording film layer No. 25 for use in the present invention was prepared. The characteristics of the thus obtained recording film layer are the same as those of recording film layer No. 21 prepared in Example 21.

By use of the recording film layer No. 25, an optical recording disk was prepared in the same manner as in Example 21, the recording characteristics of the optical recording disk are the same as those of the optical recording disk prepared in Example 21.

According to the present invention, the finely-divided particles of metals contained in the recording film layer are covered and protected in a three-dimensional configuration by a carbon-based hydrocarbon polymer, so that the recording film layer itself has significant mechanical strength, heat resistance, and corrosion resistance, and accordingly has excellent memory performance for a long period of time.

Furthermore, the recording film layer is prepared by glow discharging decomposition of organic metallic complexes and the particle size of the metals dispersed in the recording film layer can be selected as desired, so that the recording characteristics of the recording film layer, such as recording sensitivity and erasing sensitivity, can be controlled as desired, and the source of metals for use in the recording film layer is expanded.

What is claimed is:

1. An information recording medium comprising a substrate an da recording film layer formed thereon comprising a hydrocarbon polymer and finely-divided particles of a metallic component dispersed in said hydrocarbon polymer, which recording film layer is a plasma polymerized film prepared by subjecting an organic metallic complex containing a center metal to glow discharging decomposition.

2. The information recording medium as claimed in claim 1, wherein said metallic component is a metal.

3. The information recording medium as claimed in claim 1, wherein said metallic component is a metal oxide.

4. The information recording medium as claimed in claim 1, wherein said metallic component comprises a metal and a metallic oxide.

5. The information recording medium as claimed in claim 1, wherein said recording film layer has a thickness ranging from 100 Å to 10,000 Å.

6. The information recording medium as claimed in claim 5, wherein said recording film layer has a thickness ranging from 200 Å to 5,000 Å.

7. The information recording medium as claimed in claim 1, wherein the content of the finely-divided particles of said metallic component in said recording film layer is in the range of 5 wt.% to 95 wt.% of the entire weight of said recording film layer.

8. The information recording medium as claimed in claim 7, wherein the content of the finely-divided particles of said metallic component in said recording film layer is in the range of 20 wt.% to 80 wt.% of the entire weight of said recording film layer.

9. The information recording medium as claimed in claim 2, wherein said metal is selected from the group consisting of iron, nickel, cobalt, copper and titanium.

10. The information recording medium as claimed in claim 3, wherein said metallic oxide is selected from the group consisting of iron oxide, nickel oxide, cobalt oxide, copper oxide and titanium oxide.

11. The information recording medium as claimed in claim 3, wherein said metallic oxide is cuprous oxide ($Cu_2O$).

12. The information recording medium as claimed in claim 3, wherein said metallic oxide is cupric oxide (CuO).

13. The information recording medium as claimed in claim 4, wherein the amount of said metallic oxide is 10 wt.% or more of the entire weight of said metal and said metallic oxide.

14. The information recording medium as claimed in claim 1, wherein said hydrocarbon polymer of said recording film layer has a hardness of 100 kg/mm$^2$ or more in terms of Vicker's hardness.

15. The information recording medium as claimed in claim 1, wherein said center metal has a standard electrode potential of −0.5 V or more.

16. A method of recording information comprising the step of applying laser beams to an information recording medium comprising a substrate and a recording film layer formed thereon comprising a hydrocarbon polymer and finely-divided particles of a metal dispersed in said hydrocarbon polymer, which recording film layer is a plasma polymerized film prepared by subjecting an organic metallic complex containing a center metal to glow discharging decomposition.

17. A method of recording information comprising the steps of:
   applying electron rays to an optical memory medium comprising a substrate and a recording film layer formed thereon comprising a hydrocarbon polymer and finely-divided particles of a metallic oxide dispersed in said hydrocarbon polymer, which recording film layer is a plasma polymerized film prepared by subjecting an organic metallic complex containing a center metal to glow discharging decomposition, so as to reduce said metal oxide to the corresponding metal in said recording film layer for recording information in said recording film layer, and
   subjecting said recording film layer to a heat treatment for erasing said recorded information.

* * * * *